US012574196B2

(12) United States Patent
Abotabl et al.

(10) Patent No.: US 12,574,196 B2
(45) Date of Patent: Mar. 10, 2026

(54) FREQUENCY RESOURCE CONFIGURATIONS IN FULL-DUPLEX NETWORKS

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 878 days.

(21) Appl. No.: 17/885,801

(22) Filed: Aug. 11, 2022

(65) Prior Publication Data

US 2024/0056277 A1      Feb. 15, 2024

(51) Int. Cl.
| | |
|---|---|
| *H04L 5/14* | (2006.01) |
| *H04W 72/0446* | (2023.01) |
| *H04W 72/0453* | (2023.01) |
| *H04W 72/23* | (2023.01) |

(52) U.S. Cl.
CPC ........... *H04L 5/14* (2013.01); *H04W 72/0446* (2013.01); *H04W 72/0453* (2013.01); *H04W 72/23* (2023.01)

(58) Field of Classification Search
USPC ....... 370/229, 230, 236, 252, 276, 277, 278, 370/280, 281, 282, 294, 295, 328, 329, 370/330, 343, 345
See application file for complete search history.

(56) References Cited

U.S. PATENT DOCUMENTS

| | | | |
|---|---|---|---|
| 2023/0199730 A1* | 6/2023 | Rudolf | H04L 1/0025 370/329 |
| 2023/0254829 A1* | 8/2023 | Xiong | H04L 1/1861 370/329 |
| 2023/0275736 A1* | 8/2023 | Abdelghaffar | H04L 5/0094 370/276 |
| 2023/0421341 A1* | 12/2023 | Ibrahim | H04W 72/23 |
| 2024/0039655 A1* | 2/2024 | Rudolf | H04L 1/0003 |

* cited by examiner

*Primary Examiner* — Nguyen H Ngo
(74) *Attorney, Agent, or Firm* — Holland & Hart LLP

(57) ABSTRACT

Methods, systems, and devices for wireless communication are described. A user equipment (UE) may receive an indication of a frequency domain resource allocation (FDRA) for communications associated with a subband full-duplex (SBFD) slot. The UE may identify, based at least in part on an overlap between a bandwidth part associated with the communications and a first subband of the SBFD slot, a starting resource block within the first subband of the SBFD slot of at least one resource block set associated with the FDRA, wherein the first subband of the SBFD slot has a different bandwidth than the bandwidth part. The UE may perform the communications during the SBFD slot in the first subband using the at least one resource block set.

25 Claims, 18 Drawing Sheets

Receive an indication of a frequency domain resource allocation for communications associated with a subband full-duplex (SBFD) slot ⟍ 1505

Identify, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part ⟍ 1510

Perform the communications during the SBFD slot in the first subband using the at least one resource block set ⟍ 1515

Network
Entity

Transceiver

1410

Antenna

1415

Communications
Manager

1420

Memory

Code

1430

1425

1440

Processor

1435

1405

1400

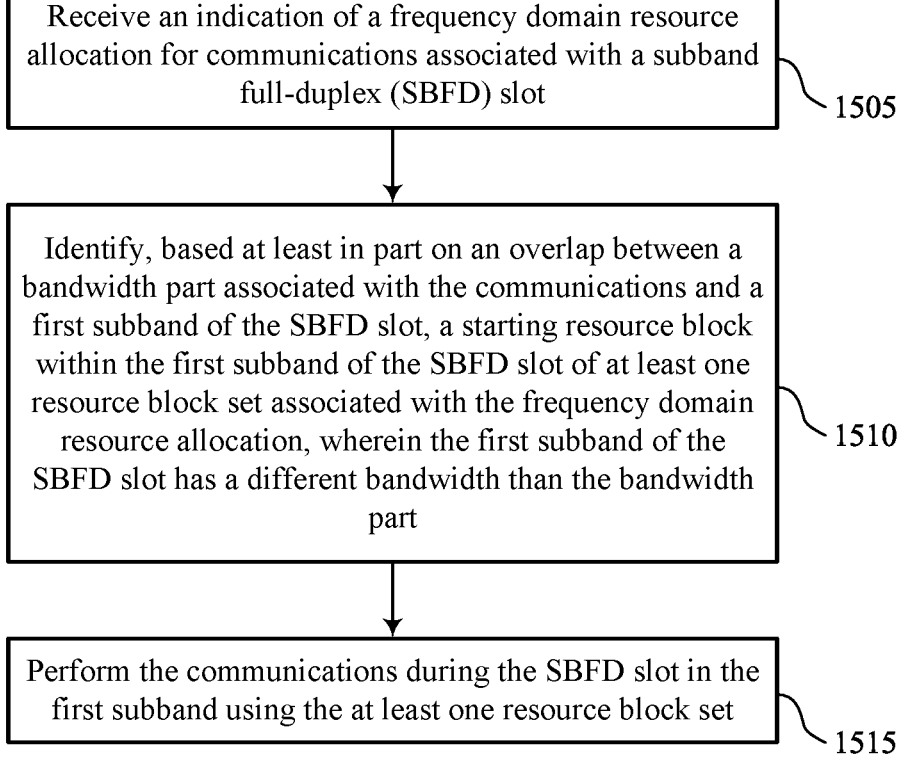

Receive an indication of a frequency domain resource allocation for communications associated with a subband full-duplex (SBFD) slot

1505

Identify, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part

1510

Perform the communications during the SBFD slot in the first subband using the at least one resource block set

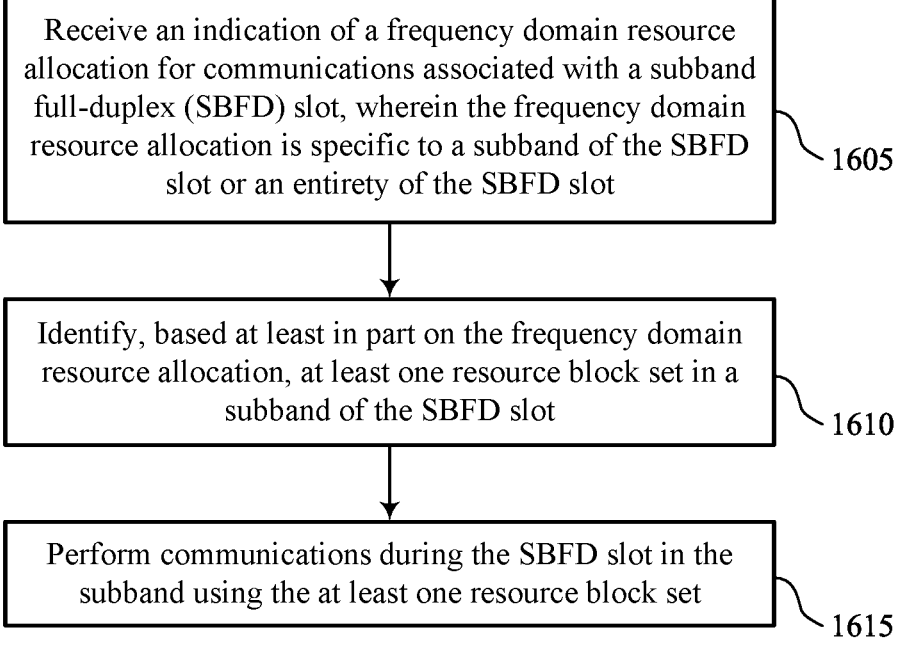

Receive an indication of a frequency domain resource allocation for communications associated with a subband full-duplex (SBFD) slot, wherein the frequency domain resource allocation is specific to a subband of the SBFD slot or an entirety of the SBFD slot

1605

Identify, based at least in part on the frequency domain resource allocation, at least one resource block set in a subband of the SBFD slot

1610

Perform communications during the SBFD slot in the subband using the at least one resource block set

Figure 17:
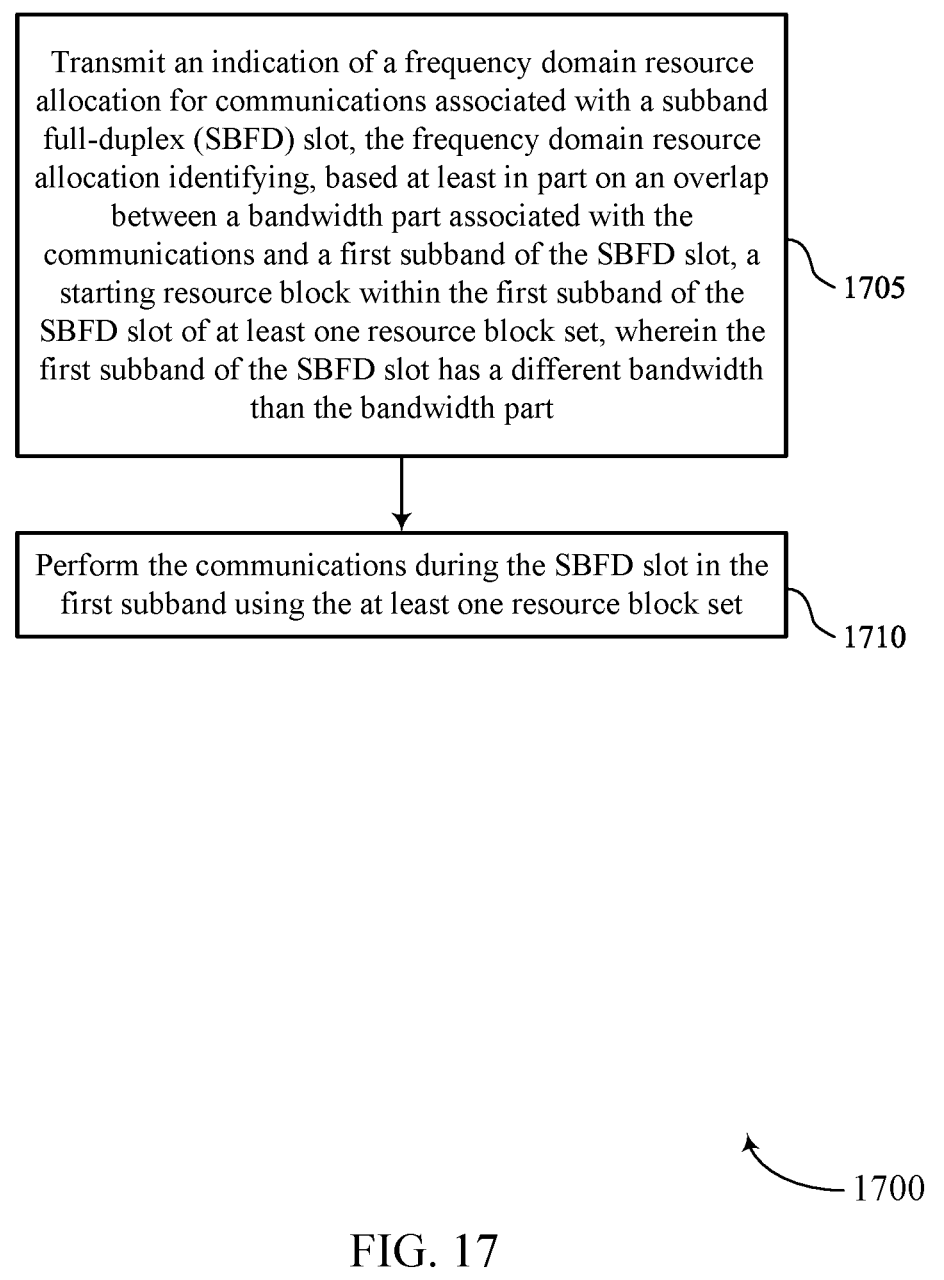

Transmit an indication of a frequency domain resource allocation for communications associated with a subband full-duplex (SBFD) slot, the frequency domain resource allocation identifying, based at least in part on an overlap between a bandwidth part associated with the communications and a first subband of the SBFD slot, a starting resource block within the first subband of the SBFD slot of at least one resource block set, wherein the first subband of the SBFD slot has a different bandwidth than the bandwidth part

1705

Perform the communications during the SBFD slot in the first subband using the at least one resource block set

Figure 18:
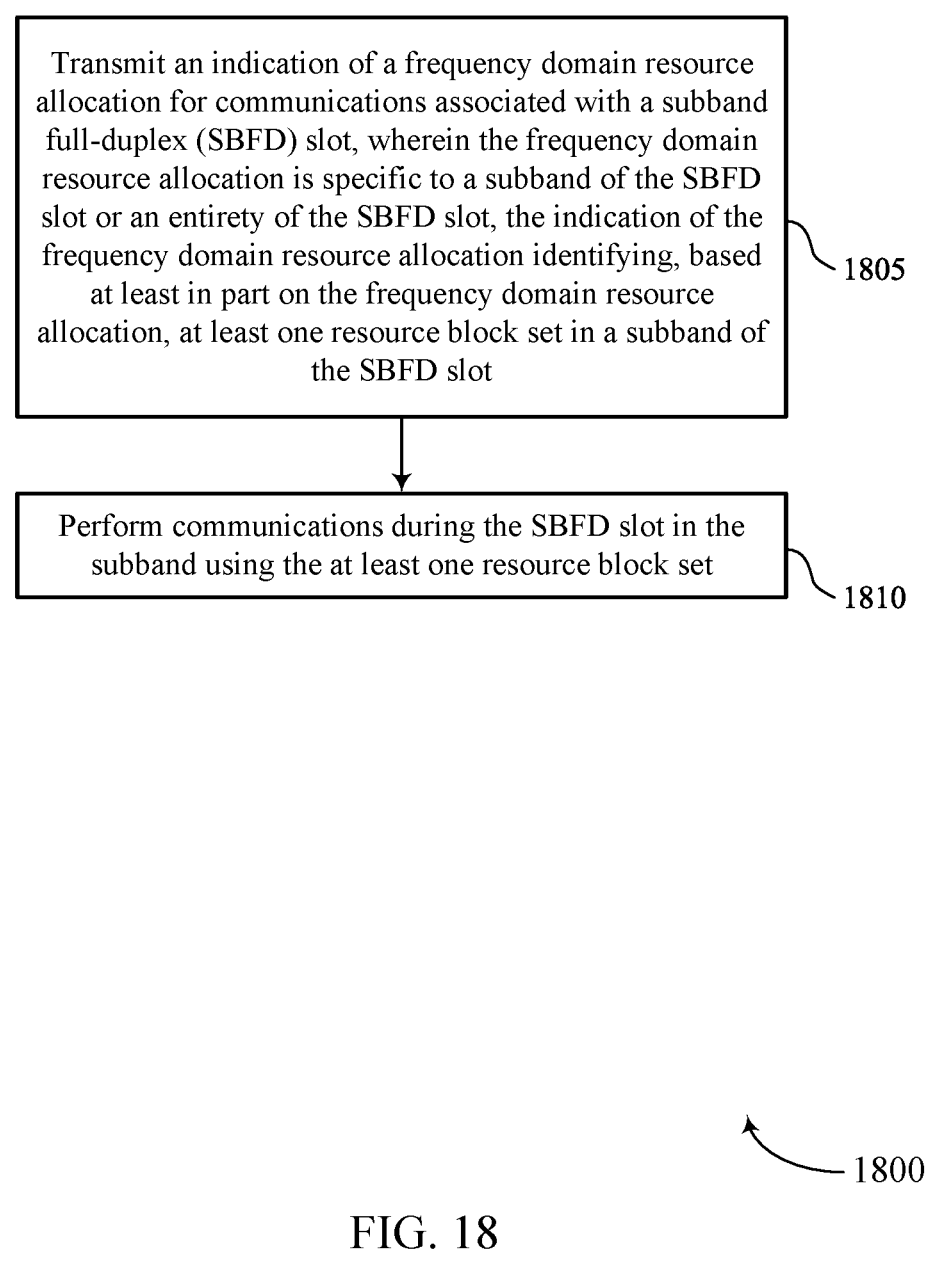

Transmit an indication of a frequency domain resource allocation for communications associated with a subband full-duplex (SBFD) slot, wherein the frequency domain resource allocation is specific to a subband of the SBFD slot or an entirety of the SBFD slot, the indication of the frequency domain resource allocation identifying, based at least in part on the frequency domain resource allocation, at least one resource block set in a subband of the SBFD slot

1805

Perform communications during the SBFD slot in the subband using the at least one resource block set

FREQUENCY RESOURCE CONFIGURATIONS IN FULL-DUPLEX NETWORKS

TECHNICAL FIELD

The following relates to wireless communication, including frequency resource configurations in full-duplex networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support frequency resource configurations in full-duplex networks. For example, the described techniques provide various techniques for signaling or otherwise indicating frequency resources to a user equipment (UE) operating in a full-duplex slot. The UE may be associated with a bandwidth part (BWP) identifying frequency domain resources used for communications. The UE may use the frequency domain resources in the BWP for communications during one or more slots, for example. The UE may also receive a frequency domain resource allocation (FDRA) indication for communications during a subband full-duplex (SBFD) slot, with the SBFD slot having at least one uplink subband and at least one downlink subband. The UE may identify or otherwise determine the starting resource block (RB) within a first subband (e.g., the uplink or downlink subband) based on an overlap of the BWP and the first subband in the SBFD slot. That is, the UE may identify or otherwise determine the starting RB of at least one RB set within the first subband of the SBFD slot based on the FDRA indication. Examples of this may include using a separate FDRA Type 1 indication for each subband of the SBFD slot or using a shared FDRA Type 1 indication where the starting RB is based, at least to some degree, on the subband. Accordingly, the UE may identify or otherwise determine the first subband in a SBFD slot based on the FDRA indication when the BWP has a different bandwidth than the first subband in the SBFD slot (e.g., a wider bandwidth or a narrow bandwidth, a partially overlapping bandwidth or a non-overlapping bandwidth). Accordingly, the UE may use the frequency domain resource in the first subband (e.g., the RB set(s) in the uplink or downlink subband) of the SBFD slot to perform communications during the SBFD slot.

In some aspects, the improved FDRA allocation and indication techniques may include the FDRA indication being specific to a subband within the SBFD slot or to the entirety of the SBFD slot (e.g., for all subband(s) within the SBFD slot). For example, the UE may receive the FDRA indication and identify or otherwise determine at least one RB set (e.g., the first or starting RB within the first RB set within a subband) within the SBFD slot. As an example, the first available RB (e.g., the starting RB) indicated in the FDRA may be for the first or starting RB in the subband (e.g., specific to a subband). For example, a UE configured with a BWP for uplink communications or for downlink communications may find that the BWP (which consists of one or more RB sets) is different than a corresponding uplink or downlink subband such that one or more of the RB set(s) within the BWP extend into (e.g., overlap with) an opposing subband (e.g., a downlink BWP includes RB sets that are within an uplink subband, or vice versa, which may be referred to as a second subband of the SBFD slot in this example). Based on this overlap, the UE may drop RB set(s) that overlap with the second subband, multiplex the communications on the overlapping RB set(s) into another SBFD slot, or the UE may modify the RB sets based on the overlap (e.g., narrow the RBs within the RB set(s) and extend the communications in the time domain). In the situation where the SBFD slot includes disjointed subbands (e.g., two uplink subbands separated by a downlink subband, or vice versa), the FDRA indication may additionally or alternatively indicate an offset between the RB set(s) in the disjointed subbands. Accordingly, the UE may use the frequency domain resource in the subband (e.g., the RB set(s) in the subband) of the SBFD slot to perform communications during the SBFD slot.

A method for wireless communication at a UE is described. The method may include receiving an indication of a FDRA for communications associated with a SBFD slot, identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP, and performing the communications during the SBFD slot in the first subband using the at least one RB set.

An apparatus for wireless communication at a UE is described. The apparatus may include at least one processor, and memory coupled with the at least one processor, the memory storing instructions. The instructions may be executable by the at least one processor to cause the UE to receive an indication of a FDRA for communications associated with a SBFD slot, identify, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP, and perform the communications during the SBFD slot in the first subband using the at least one RB set.

Another apparatus for wireless communication at a UE is described. The apparatus may include means for receiving an indication of a FDRA for communications associated with a SBFD slot, means for identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP, and means for performing the communications during the SBFD slot in the first subband using the at least one RB set.

A non-transitory computer-readable medium storing code for wireless communication at a UE is described. The code may include instructions executable by a processor to receive an indication of a FDRA for communications associated with a SBFD slot, identify, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP, and perform the communications during the SBFD slot in the first subband using the at least one RB set.

Some examples of the method, apparatuses, and non-transitory computer-readable medium described herein may further include operations, features, means, or instructions for identifying, based on the indication of the FDRA, a first FDRA for the first subband and a second FDRA for communications in a second subband, where the starting RB of the at least one RB set may be identified based on the first FDRA.

In some examples of the method, apparatuses, and non-transitory computer-readable medium described herein, a number of bits in the first FDRA and the second FDRA may be based on a number of RBs in the overlap between the BWP and the first subband of the SBFD slot.

In some examples of the method, apparatuses, and non-transitory computer-readable medium described herein, the indication includes a separate FDRA for each subband in the SBFD slot.

Some examples of the method, apparatuses, and non-transitory computer-readable medium described herein may further include operations, features, means, or instructions for identifying, based on the indication of the FDRA, a shared FDRA for the first subband and a second subband in the SBFD slot, where the starting RB of the at least one RB set may be identified based on the shared FDRA.

In some examples of the method, apparatuses, and non-transitory computer-readable medium described herein, the shared FDRA includes a set of redundant bits associated with the first subband.

In some examples of the method, apparatuses, and non-transitory computer-readable medium described herein, the shared FDRA includes a number of bits that may be based on a number of RBs in the overlap between the BWP and the first subband of the SBFD slot.

In some examples of the method, apparatuses, and non-transitory computer-readable medium described herein, the shared FDRA includes an indication of the starting RB and a total number of RBs in the at least one RB set.

A method for wireless communication at a UE is described. The method may include receiving an indication of a FDRA for communications associated with a SBFD slot, where the FDRA is specific to a subband of the SBFD slot or an entirety of the SBFD slot, identifying, based on the FDRA, at least one RB set in a subband of the SBFD slot, and performing communications during the SBFD slot in the subband using the at least one RB set.

An apparatus for wireless communication at a UE is described. The apparatus may include at least one processor, and memory coupled with the at least one processor, the memory storing instructions. The instructions may be executable by the at least one processor to cause the UE to receive an indication of a FDRA for communications associated with a SBFD slot, where the FDRA is specific to a subband of the SBFD slot or an entirety of the SBFD slot, identify, based on the FDRA, at least one RB set in a subband of the SBFD slot, and perform communications during the SBFD slot in the subband using the at least one RB set.

Another apparatus for wireless communication at a UE is described. The apparatus may include means for receiving an indication of a FDRA for communications associated with a SBFD slot, where the FDRA is specific to a subband of the SBFD slot or an entirety of the SBFD slot, means for identifying, based on the FDRA, at least one RB set in a subband of the SBFD slot, and means for performing communications during the SBFD slot in the subband using the at least one RB set.

A non-transitory computer-readable medium storing code for wireless communication at a UE is described. The code may include instructions executable by a processor to receive an indication of a FDRA for communications associated with a SBFD slot, where the FDRA is specific to a subband of the SBFD slot or an entirety of the SBFD slot, identify, based on the FDRA, at least one RB set in a subband of the SBFD slot, and perform communications during the SBFD slot in the subband using the at least one RB set.

Some examples of the method, apparatuses, and non-transitory computer-readable medium described herein may further include operations, features, means, or instructions for identifying, based on a different bandwidth of a BWP relative to the subband of the SBFD slot, a starting RB of the at least one RB set in the subband according to the FDRA.

Some examples of the method, apparatuses, and non-transitory computer-readable medium described herein may further include operations, features, means, or instructions for identifying one or more RB sets in the subband that overlap with a second subband of the SBFD slot and dropping the one or more RB sets for the communications based on the overlap with the second subband.

Some examples of the method, apparatuses, and non-transitory computer-readable medium described herein may further include operations, features, means, or instructions for identifying a second RB set in the subband that overlaps with a second subband of the SBFD slot and performing the communication during the SBFD slot using the at least one RB set and communications during a second SBFD slot using the second RB set based on the overlap with the second subband.

Some examples of the method, apparatuses, and non-transitory computer-readable medium described herein may further include operations, features, means, or instructions for identifying a second RB set in the subband that overlaps with a second subband of the SBFD slot, modifying the at least one RB set and the second RB set based on the overlap, and performing the communication during the SBFD slot using the modified at least one RB set and second RB set.

Some examples of the method, apparatuses, and non-transitory computer-readable medium described herein may further include operations, features, means, or instructions for identifying a second RB set in the subband that overlaps with a second subband of the SBFD slot, identifying an offset between the at least one RB set and the second RB set, where the offset identifies RB sets offset in the subband that may be a disjointed subband, and performing the communication during the SBFD slot using the at least one RB set and the second RB set based on the disjointed subband.

A method for wireless communication at a network entity is described. The method may include transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP and performing the communications during the SBFD slot in the first subband using the at least one RB set.

An apparatus for wireless communication at a network entity is described. The apparatus may include at least one processor, and memory coupled with the at least one processor, the memory storing instructions. The instructions may be executable by the at least one processor to cause the network entity to transmit an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP and perform the communications during the SBFD slot in the first subband using the at least one RB set.

Another apparatus for wireless communication at a network entity is described. The apparatus may include means for transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP and means for performing the communications during the SBFD slot in the first subband using the at least one RB set.

A non-transitory computer-readable medium storing code for wireless communication at a network entity is described. The code may include instructions executable by a processor to transmit an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP and perform the communications during the SBFD slot in the first subband using the at least one RB set.

Some examples of the method, apparatuses, and non-transitory computer-readable medium described herein may further include operations, features, means, or instructions for identifying, based on the indication of the FDRA, a first FDRA for the first subband and a second FDRA for communications in a second subband, where the starting RB of the at least one RB set may be identified based on the first FDRA.

In some examples of the method, apparatuses, and non-transitory computer-readable medium described herein, a number of bits in the first FDRA and the second FDRA may be based on a number of RBs in the overlap between the BWP and the first subband of the SBFD slot.

In some examples of the method, apparatuses, and non-transitory computer-readable medium described herein, the indication includes a separate FDRA for each subband in the SBFD slot.

Some examples of the method, apparatuses, and non-transitory computer-readable medium described herein may further include operations, features, means, or instructions for identifying, based on the indication of the FDRA, a shared FDRA for the first subband and a second subband in the SBFD slot, where the starting RB of the at least one RB set may be identified based on the shared FDRA.

In some examples of the method, apparatuses, and non-transitory computer-readable medium described herein, the shared FDRA includes a set of redundant bits associated with the first subband.

In some examples of the method, apparatuses, and non-transitory computer-readable medium described herein, the shared FDRA includes a number of bits that may be based on a number of RBs in the overlap between the BWP and the first subband of the SBFD slot.

In some examples of the method, apparatuses, and non-transitory computer-readable medium described herein, the shared FDRA includes an indication of the starting RB and a total number of RBs in the at least one RB set.

A method for wireless communication at a network entity is described. The method may include transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot and performing communications during the SBFD slot in the subband using the at least one RB set.

An apparatus for wireless communication at a network entity is described. The apparatus may include at least one processor, and memory coupled with the at least one processor, the processor storing instructions. The instructions may be executable by the at least one processor to cause the network entity to transmit an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot and perform communications during the SBFD slot in the subband using the at least one RB set.

Another apparatus for wireless communication at a network entity is described. The apparatus may include means for transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot and means for performing communications during the SBFD slot in the subband using the at least one RB set.

A non-transitory computer-readable medium storing code for wireless communication at a network entity is described. The code may include instructions executable by a processor to transmit an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot and perform communications during the SBFD slot in the subband using the at least one RB set.

Some examples of the method, apparatuses, and non-transitory computer-readable medium described herein may further include operations, features, means, or instructions for identifying, based on a different bandwidth of the BWP relative to the subband of the SBFD slot, a starting RB of the at least one RB set in the subband according to the FDRA.

Some examples of the method, apparatuses, and non-transitory computer-readable medium described herein may further include operations, features, means, or instructions for identifying one or more RB sets in the subband that overlap with a second subband of the SBFD slot and dropping the one or more RB sets for the communications based on the overlap with the second subband.

Some examples of the method, apparatuses, and non-transitory computer-readable medium described herein may further include operations, features, means, or instructions for identifying a second RB set in the subband that overlaps with a second subband of the SBFD slot and performing the communication during the SBFD slot using the at least one RB set and communications during a second SBFD slot using the second RB set based on the overlap with the second subband.

Some examples of the method, apparatuses, and non-transitory computer-readable medium described herein may further include operations, features, means, or instructions for identifying a second RB set in the subband that overlaps with a second subband of the SBFD slot, modifying the at least one RB set and the second RB set based on the overlap, and performing the communication during the SBFD slot using the modified at least one RB set and second RB set.

Some examples of the method, apparatuses, and non-transitory computer-readable medium described herein may further include operations, features, means, or instructions for identifying a second RB set in the subband that overlaps with a second subband of the SBFD slot, identifying an offset between the at least one RB set and the second RB set, where the offset identifies RB sets offset in the subband that may be a disjointed subband, and performing the communication during the SBFD slot using the at least one RB set and the second RB set based on the disjointed subband.

BRIEF DESCRIPTION OF THE DRAWINGS

FIG. 6 illustrates an example of a slot configuration that supports frequency resource configurations in full-duplex networks in accordance with one or more aspects of the present disclosure.

FIGS. 15 through 18 show flowcharts illustrating methods that support frequency resource configurations in full-duplex networks in accordance with one or more aspects of the present disclosure.

DETAILED DESCRIPTION

Figure 1:
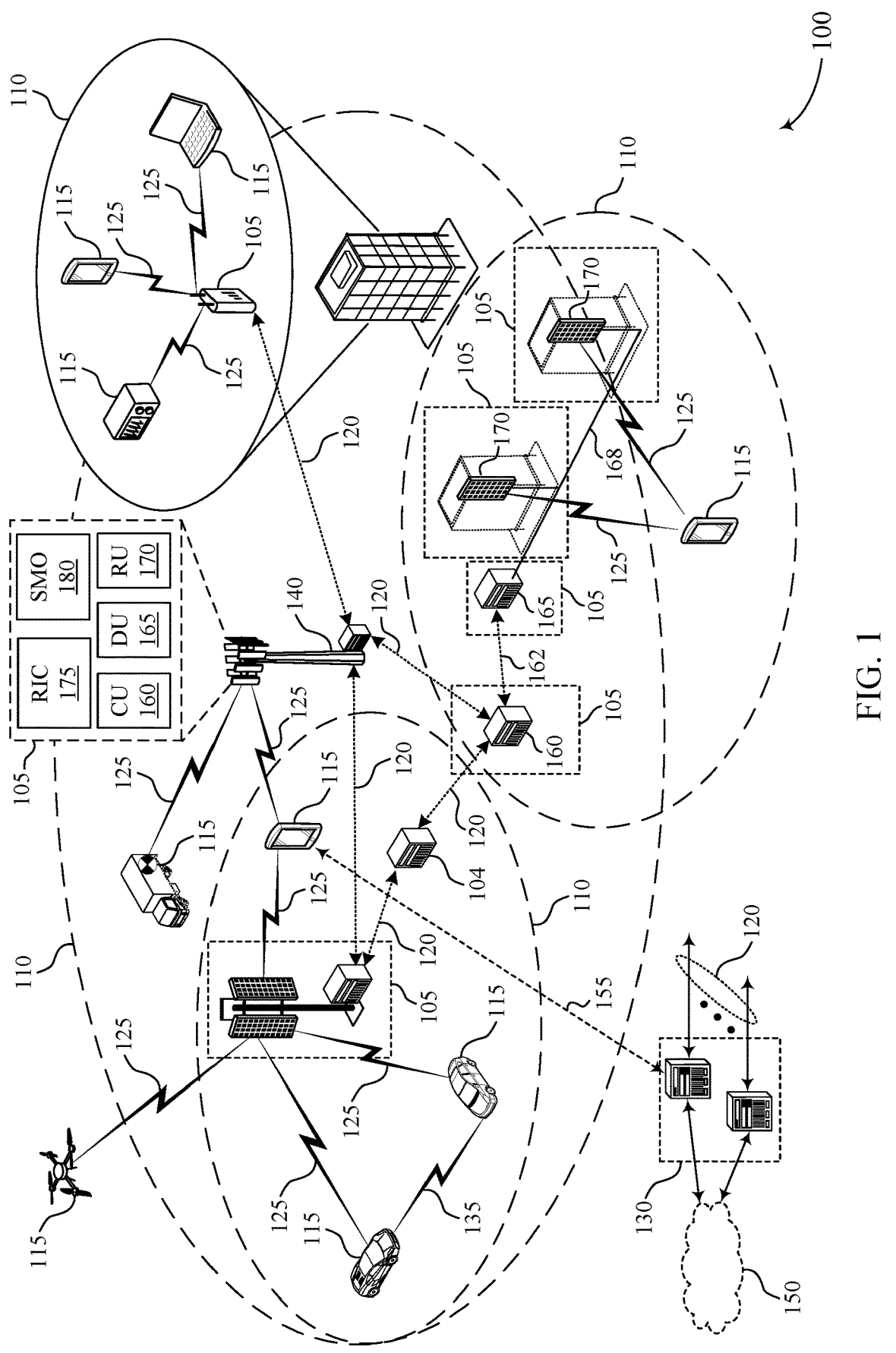
FIG. 1 illustrates an example of a wireless communications system that supports frequency resource configurations in full-duplex networks in accordance with one or more aspects of the present disclosure.

Wireless networks may communicate according to various multiplexing techniques. For example, some networks designate certain slots (e.g., time domain resources) as uplink slots having uplink resources, downlink slots having downlink resources, or as slots having both uplink and downlink resources (e.g., frequency domain resources). One example of slots combining uplink and downlink resources may include a subband full-duplex (SBFD) slot (e.g., "flexible duplex" slots) having one or more uplink subbands, one or more downlink subbands, and optionally one or more guard or gap bands between adjacent uplink and downlink subbands to mitigate inter-subband leakage or interference. A user equipment (UE) performing wireless communications may receive an indication of a specific bandwidth part (BWP) identifying the frequency resources to be used for wireless communications during the slots. For example, frequency resources are indicated to the UE in a frequency domain resource allocation (FDRA) field identifying frequency domain resources at the resource block (RB) level, with a RB consisting of 12 adjacent frequencies and multiple RBs forming a RB set or a RB group (RBG). A Type 0 FRDR indication may use a bitmap where each bit corresponds to a RBG whereas a Type 1 FDRA indication may identify a starting RB and the number of consecutive RBs of the configured frequency domain resources.

However, the BWP of the UE may span one, some, or all of the subbands within the SBFD slot. For example, for a UE associated with an uplink BWP (e.g., frequency resources designated for uplink communications) during uplink slots, there may be an overlap between the configured uplink BWP and one or more of the downlink subbands associated with an SBFD slot following the uplink slot. In the Type 1 FDRA indication scenario, this overlap may result in the starting RB of the BWP beginning in a downlink subband during the SBFD slot or result in the consecutive RBs extending into an adjacent downlink subband. Accordingly, such conventional FDRA indication techniques may result in a difficulty (e.g., a failure) in identifying frequency domain resources (e.g., the uplink or downlink subband(s)) within the SBFD slot. This may result in a loss of communications, increased interference, as well as other communication issues, during SBFD slots.

Accordingly, the described techniques provide various techniques for signaling or otherwise indicating frequency resources to a UE operating in a full-duplex slot. The UE may be associated with a BWP identifying frequency domain resources used for communications. The UE may use the frequency domain resources in the BWP for communications during one or more slots, for example. The UE may also receive a FDRA indication for communications during a SBFD slot. The UE may identify or otherwise determine the starting RB within a first subband (e.g., the uplink or downlink subband) based on an overlap of the BWP and the first subband in the SBFD slot. That is, the UE may identify or otherwise determine the starting RB of at least one RB set within the first subband of the SBFD slot based on the FDRA indication. Examples of this may include using a separate FDRA Type 1 indication for each subband of the SBFD slot or using a shared FDRA Type 1 indication where the starting RB is based, at least to some degree, on the subband. Accordingly, the UE may identify or otherwise determine the first subband in a SBFD slot based on the FDRA indication when the BWP has a different bandwidth than the first subband in the SBFD slot. Accordingly, the UE may use the frequency domain resource in the first subband (e.g., the RB set(s) in the uplink or downlink subband) of the SBFD slot to perform communications during the SBFD slot.

In some aspects, the improved FDRA allocation and indication techniques may include the FDRA indication being specific to a subband within the SBFD slot or to the entirety of the SBFD slot (e.g., for all subband(s) within the SBFD slot). For example, the UE may receive the FDRA indication and identify or otherwise determine at least one RB set (e.g., the first or starting RB within the first RB set within a subband) within the SBFD slot. An example of this may include the first available RB (e.g., the starting RB) indicated in the FDRA may be for the first or starting RB in the subband (e.g., specific to a subband). For example, a UE configured with a BWP for uplink communications or for downlink communications may find that the BWP (which consists of one or more RB sets) is different than a corresponding uplink or downlink subband such that one or more of the RB set(s) within the BWP extend into (e.g., overlap with) an opposing subband (e.g., a downlink BWP includes RB sets that are within an uplink subband, or vice versa, which may be referred to as a second subband of the SBFD slot in this example). Based on this overlap, the UE may drop RB set(s) that overlap with the second subband, multiplex the communications on the overlapping RB set(s) into another SBFD slot, or the UE may modify the RB sets based on the overlap (e.g., narrow the RBs within the RB set(s) and extend the communications in the time domain). In the situation where the SBFD slot includes disjointed subbands (e.g., two uplink subbands separated by a downlink subband, or vice versa), the FDRA indication may additionally or alternatively indicate an offset between the RB set(s) in the disjointed subbands. Accordingly, the UE may use the frequency domain resource in the subband (e.g., the RB set(s) in the subband) of the SBFD slot to perform communications during the SBFD slot.

Aspects of the disclosure are initially described in the context of wireless communications systems. Aspects of the disclosure are further illustrated by and described with reference to apparatus diagrams, system diagrams, and flow-charts that relate to frequency resource configurations in full-duplex networks.

FIG. 1 illustrates an example of a wireless communications system 100 that supports frequency resource configurations in full-duplex networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support frequency resource configurations in full-duplex networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), or FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz. The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive an indication of a FDRA for communications associated with a SBFD slot. The UE 115 may identify, based at least in part on an overlap between a BWP associated with the communications and a first subband of the SBFD slot, a starting RB within the first subband of the SBFD slot of at least one RB set associated with the FDRA, wherein the first subband of the SBFD slot has a different bandwidth than the BWP. The UE 115 may perform the communications during the SBFD slot in the first subband using the at least one RB set.

A UE 115 may receive an indication of a FDRA for communications associated with a SBFD slot, wherein the FDRA is specific to a subband of the SBFD slot or an entirety of the SBFD slot. The UE 115 may identify, based at least in part on the FDRA, at least one RB set in a subband of the SBFD slot. The UE 115 may perform communications during the SBFD slot in the subband using the at least one RB set.

A network entity 105 may transmit an indication of a FDRA for communications associated with a SBFD slot, the FDRA identifying, based at least in part on an overlap between a BWP associated with the communications and a first subband of the SBFD slot, a starting RB within the first subband of the SBFD slot of at least one RB set, wherein the first subband of the SBFD slot has a different bandwidth than the BWP. The network entity 105 may perform the communications during the SBFD slot in the first subband using the at least one RB set.

A network entity 105 may transmit an indication of a FDRA for communications associated with a SBFD slot, wherein the FDRA is specific to a subband of the SBFD slot or an entirety of the SBFD slot, the indication of the FDRA identifying, based at least in part on the FDRA, at least one RB set in a subband of the SBFD slot. The network entity 105 may perform communications during the SBFD slot in the subband using the at least one RB set.

Figure 2:
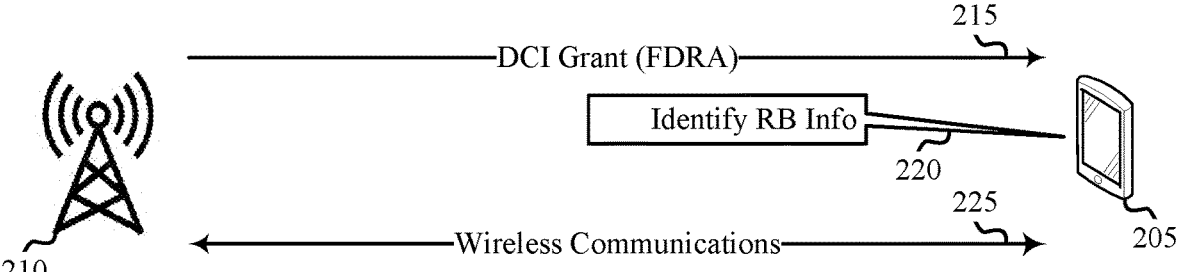
FIG. 2 illustrates an example of a wireless communication system that supports frequency resource configurations in full-duplex networks in accordance with one or more aspects of the present disclosure.

FIG. 2 illustrates an example of a wireless communication system 200 that supports frequency resource configurations in full-duplex networks in accordance with one or more aspects of the present disclosure. Wireless communication system 200 may implement aspects of wireless communication system 100. Wireless communication system 200 may include UE 205 and network entity 210, which may be examples of the corresponding devices described herein.

Wireless communication system 200 may support full-duplex (FD) operations, such as using SBFD slots (e.g., "flexible duplex" slots) having one or more uplink subbands, one or more downlink subbands, and optionally one or more guard or gap bands between adjacent uplink and downlink subbands. A SBFD slot enables transmitting and receiving at the same time, but on different frequency resources (e.g., the downlink resources and separated from the uplink resources in the frequency domain). Other examples of FD operations include using an in-band full-duplex (IBFD) slots where the downlink and uplink share the same IBFD time and frequency resources (e.g., fully or at least partially overlapping). Accordingly, communications during an IBFD slot include transmitting and receiving at the same time and using the same frequency resources.

Accordingly, a FD slot structure may also be referred to as a "D+U" slot to signify that both downlink and uplink communications are performed during the FD slot. A FD slot structure is defined as both downlink transmissions and uplink transmissions occurring at the same time and in overlapping bands (e.g., IBFD) or in adjacent bands (e.g., adjacent subbands within a SBFD slot). In a given symbol of a FD slot, a half-duplex (HD) UE can either perform an uplink transmission in the uplink band or receive a downlink transmission in the downlink band. In a given symbol of a FD slot, a FD UE can both perform an uplink transmission in the uplink band (IBFD) or uplink subband (SBFD) and receive a downlink transmission in the downlink band (IBFD) or downlink subband (SBFD).

Frequency resources (e.g., the band or subbands) are indicated to the UE in a FDRA field identifying frequency domain resources at the RB level, with a RB consisting of 12 adjacent frequencies (also referred to as tones or subcarriers) and multiple RBs forming a RB set or a RBG. The FDRA field may utilize a Type 0 or a Type 1 format for identifying or configuring the frequency domain resources for a UE. A Type 0 FRDR indication may also be considered a disjointed RB allocation where a bitmap is used to identify the allocated or configured RBGs. The indicated frequency resource allocation may be a multiple of RBG(s), where the RBG size is based on the BWP size as well as other configurations signaled to the UE (e.g., rbg-Size). In the Type 0 FDRA format each bit corresponds to a RBG such that if the bit is set (e.g., "1") then the corresponding RBG is allocated to the UE. In contrast, a Type 1 FDRA field format is considered a consecutive RB allocation scheme where the FDRA field indicates a starting RB and a number of consecutive RBs which are combined in the resource indicator value (MV) field. That is, the number of bits representing the MV indication may be a function of the length of the BWP (e.g., a BWP spanning 5 RBs may use a four-bit RIV indication).

In the context of a SBFD slot, the BWP of the UE may span one, some, or all of the subbands within the SBFD slot. That is, due to the different frequency allocations between uplink or downlink slots and the subbands within a SBFD slot, only part of the BWP may overlap with the corresponding subband (e.g., an uplink BWP may only partially overlap with the uplink subband or a downlink BWP may only partially overlap with the downlink subband). For example, a downlink subband may span a lower half of the band while the downlink BWP spans the entire band. Furthermore, the MV indication depends on the starting RB and length of consecutive RBs being allocated. However, in SBFD slots a part of the BWP might be unavailable because it is serving the other direction (e.g., a downlink BWP may include some or all of an uplink subband, or vice versa). This results in the RIV indication containing redundant bits (e.g., the bits corresponding to the subband in the other direction).

Another example of frequency domain resources signaling issues in the context of FD communications may include a UE performing simultaneous uplink transmissions using different frequency resources. That is, a UE may be scheduled to perform an uplink transmission using two sets of RBs, with each set of RBs including one or mor RB sets and each RB set defines different RBs in the frequency domain. Each transmission may be performed according to a set of parameters, such as power control, or precoder. The two RB sets (e.g., different frequency resources) enable the UE to perform the uplink transmissions to two (e.g., different) TRPs to improve diversity, for example.

Again, the UE may be configured with two slot structures having uplink resources (e.g., an uplink slot having uplink resources or a FD slot having both uplink and downlink resources). That is, the UE may be configured with an uplink BWP to use for uplink transmissions during uplink slots, but may also perform uplink transmissions in the uplink subband(s) during a SBFD slot. The uplink BWP may be larger than the uplink subband(s) during the SBFD slot, which increase frequency resource allocation signaling difficulty. In the context of the two, simultaneous uplink transmissions in different sets of RBs scenario, the frequency resource allocation becomes even more complicated since an allocation in a HD slot (e.g., an uplink slot) may be different during a SBFD slot. For the SBFD slots, there may be different configurations that may result in different allocation constraints. For example, some or all of the set of RBs configured in a HD slot may overlap with a downlink subband (or gap band) in the SBFD slot.

More particularly, for a UE associated with an uplink BWP (e.g., frequency resources designated for uplink communications) during uplink slots, there may be an overlap between the configured uplink BWP and one or more of the downlink subbands associated with the SBFD slot following the uplink slot. In the Type 1 FDRA indication scenario, this may result in the starting RB of the BWP beginning in a downlink subband during the SBFD slot or result in the consecutive RBs extending into an adjacent downlink subband.

Thus, such conventional FDRA indication techniques may result in difficulty (e.g., a failure) identifying frequency domain resources (e.g., the uplink or downlink subband(s) or RB set(s) within each subband) within the SBFD slot. More particularly, as the frequency resources indicated in the FDRA field (which may be signaled in a grant) are generally interpreted based on a configured BWP (which may be RRC configured), this may present difficulties when scheduling communications in a SBFD slot because some of the frequency resources in the BWP may be mapped to the other direction (e.g., an uplink BWP spans some or all of a downlink subband, or vice versa) during the SBFD slot. This may result in a loss of communications, increased interference, as well as other communication issues, between UE 205 and network entity 210 during SBFD slots.

Accordingly, the described techniques provide various techniques for improvements to signaling or otherwise indicating frequency resources to UE 205 operating in a full-duplex slot. For example, UE 205 may be connected to network entity 210 and performing wireless communications. This may include network entity 210 transmitting or otherwise conveying (and UE 205 receiving or otherwise obtaining) an indication of a BWP, e.g., via RRC signaling. The BWP may be an uplink BWP identifying frequency resources, at least to some degree, allocated or otherwise available to UE 205 to use for performing wireless transmissions to network entity 210. The BWP may be a downlink BWP identifying frequency resources, at least to some degree, allocated or otherwise available to UE 205 to use for receiving wireless transmissions from network entity 210. The BWP may have an associated bandwidth that spans frequency resources (e.g., some or all of the band(s) available during a slot). In an uplink slot, the bandwidth of an uplink BWP may span some or all of the uplink frequency resources available within the uplink slot. In a downlink slot, the bandwidth of a downlink BWP may span some or all of the downlink frequency resources within the downlink slot. However, a BWP configured for UE 205 may generally have a different bandwidth than the subband(s) in a SBFD slot.

The UE may use the frequency domain resources in the BWP for communications during one or more slots, for example.

Network entity 210 may also transmit or otherwise convey (and UE 205 may receive or otherwise obtain) a DCI grant 215 scheduling wireless communications during a SBFD slot. For example, UE 205 may also receive a FDRA indication (e.g., carried or otherwise conveyed in DCI grant 215) for communications during the SBFD slot. In some aspects, network entity 210 may select or otherwise configure the FDRA field to signal, identify, or otherwise convey an indication of frequency domain resources for every subband in the SBFD slot (e.g., first and second FDRA indications). In some aspects, network entity 210 may select or otherwise configure the FDRA field to signal, identify, or otherwise convey an indication of frequency domain resources in all of the subbands, but interpreted such that some of the bits or other information correspond to redundant bits (e.g., identify frequency resources for subband(s) going in the other direction, or a gap band, which are unavailable for the scheduled communications).

For example, at 220 UE 205 may use the FDRA indication to identify or otherwise determine the starting RB within a first subband (e.g., the uplink or downlink subband, depending on whether the corresponding BWP is an uplink or downlink BWP) based on an overlap of the BWP and the first subband in the SBFD slot. That is, UE 205 may identify or otherwise determine the starting RB of at least one RB set within the first subband of the SBFD slot based on the FDRA indication. For example, if the BWP corresponds to a downlink BWP, UE 205 may use the FDRA indication along with the configured downlink BWP, to identify or otherwise determine the starting RB of the RB set(s) included in the downlink subband of the SBFD slot. If the BWP corresponds to an uplink BWP, UE 205 may use the FDRA indication along with the configured uplink BWP to identify or otherwise determine the starting RB of the RB set(s) included in the uplink subband of the SBFD slot.

Again, examples of this may include using a separate FDRA indication for each subband of the SBFD slot or using a shared FDRA indication where the starting RB is based, at least to some degree, on the subband. Accordingly, UE 205 may identify or otherwise determine the first subband in a SBFD slot based on the FDRA indication when the BWP has a different bandwidth than the first subband in the SBFD slot. Accordingly, UE 205 and network entity 210 may use the frequency domain resources in the first subband (e.g., the RB set(s) in the uplink or downlink subband) of the SBFD slot to perform communications during the SBFD slot. More particular, UE 205 and network entity 210 may use the frequency resources (e.g., RB set(s)) within the first subband, beginning at the starting RB, to perform wireless communications during the SBFD slot. In the uplink example, this may include UE 205 performing an uplink transmission to network entity 210 beginning with the starting RB and using the remaining number of RB set(s) (e.g., the allocated frequency domain resources) in the first subband (e.g., a downlink subband in this example). In the downlink example, this may include UE 205 receiving a downlink transmission from network entity 210 beginning in the starting RB and using the remaining number of RB sets(s) in the first subband (e.g., an uplink subband in this example).

Additionally, or alternatively, aspects of the improved FDRA allocation and indication techniques may include the FDRA indication being specific to a subband within the SBFD slot or to the entirety of the SBFD slot (e.g., for all subband(s) within the SBFD slot). Again, network entity 210 may configure UE 205 with a BWP that has a different bandwidth than the subband(s) within the SBFD slot.

Network entity 210 may transmit or otherwise provide (and UE 205 may receive or otherwise obtain) the DCI grant 215 scheduling wireless communications during a SBFD slot. The DCI grant 215 carries or otherwise conveys an indication of the FDRA field identifying frequency resources to be used during the scheduled wireless communications.

UE 205 may receive the FDRA indication and at 220 identify or otherwise determine at least one RB set in at least one subband of the SBFD slot. For example, UE 205 may identify or otherwise determine the first or starting RB within a first RB set within a subband) within the SBFD slot. An example of this may include the first available RB (e.g., the starting RB) indicated in the FDRA may be for the first or starting RB in the subband (e.g., specific to a subband). For example, UE 205 configured with a BWP for uplink communications or for downlink communications may find that the BWP (which consists of one or more RB sets) is different than a corresponding uplink or downlink subband such that one or more of the RB set(s) within the BWP extend into (e.g., overlap with) an opposing subband (e.g., a downlink BWP includes RB sets that are within an uplink subband, or vice versa, which may be referred to as a second subband of the SBFD slot in this example). Based on this overlap, UE 205 and network entity 210 may perform wireless communications 225 during the SBFD slot using the allocated RB set(s). For example, UE 205 may drop RB set(s) that overlap with the second subband (e.g., drop frequency resources going in the other direction), multiplex the communications allocated on the overlapping RB set(s) into another SBFD slot (e.g., delay the communications to the next slot), or UE 205 may modify the RB sets based on the overlap (e.g., narrow the RBs within the RB set(s) along with extending the communications in the time domain). In the situation where the SBFD slot includes disjointed subbands (e.g., two uplink subbands separated by a downlink subband, or vice versa), the FDRA indication may additionally or alternatively be configured to carry or otherwise convey an indication of an offset between the RB set(s) in the disjointed subbands. Accordingly, UE 205 and network entity 210 may use the frequency domain resources in the subband (e.g., the RB set(s) in the subband) of the SBFD slot to perform communications during the SBFD slot.

Figure 3A:
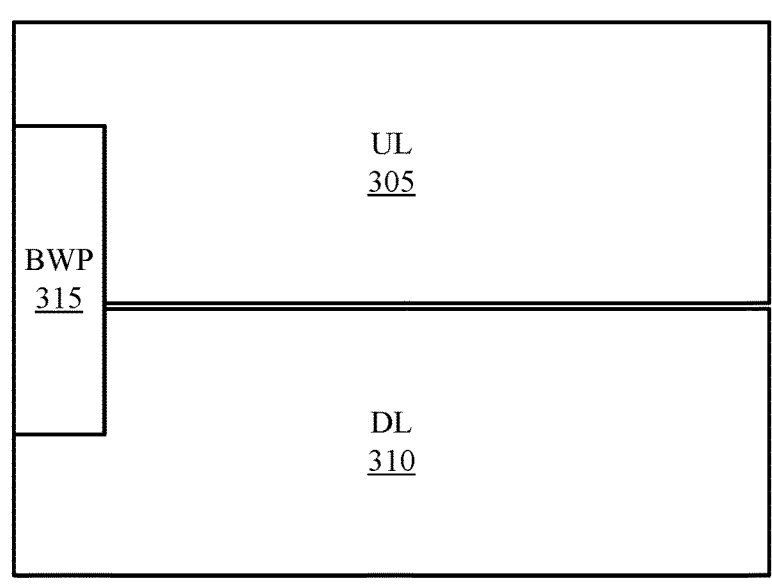
FIGS. 3A and 3B illustrate examples of a slot configuration that supports frequency resource configurations in full-duplex networks in accordance with one or more aspects of the present disclosure.
Figure 3B:
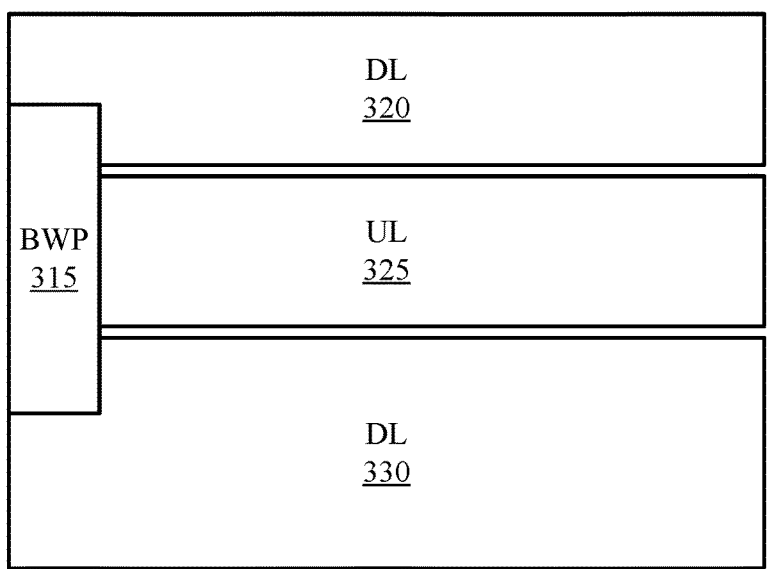

FIGS. 3A and 3B illustrate examples of a slot configuration 300 that supports frequency resource configurations in full-duplex networks in accordance with one or more aspects of the present disclosure. Slot configuration 300 may implement aspects of wireless communication systems 100 or 200. Aspects of slot configuration 300 may be implemented at or implemented by a UE or network entity, which may be examples of the corresponding devices described herein.

Slot configuration 300-a of FIG. 3A illustrates an example of a SBFD slot having an uplink subband 305 and a downlink subband 310. Slot configuration 300-b of FIG. 3B illustrates an example of a SBFD slot having disjointed subbands, such as downlink subband 320 and downlink subband 330 separated by uplink subband 325. It is to be understood that slot configuration 300 may include a gap or guard band between adjacent uplink and downlink subbands that provides a degree of separation in the frequency domain between the subbands to mitigate leakage and interference. It is to be understood that slot configuration 300-b may include two, disjointed uplink subbands separated by one downlink subband.

As discussed above, aspects of the techniques described herein provide for improved FDRA signaling techniques enabling the configuration of frequency resources (e.g., RB set(s)) in a particular subband of a SBFD slot. In some aspects, this may include techniques to improve efficiency of RIV indications. The RIV indication may include combining the FDRA indication of the starting RB and the number of consecutive RBs within a BWP (e.g., the Type 1 FDRA indication) into a single value referred to as the RIV, or resource indicator value where the resource refers to frequency resources.

For example, a UE configured with a BWP 315 may receive a DCI grant carrying or otherwise conveying a FDRA indication. The DCI grant may schedule communications during a SBFD slot, with the SBFD slot having uplink subband(s) and downlink subband(s). The BWP 315 may have a different bandwidth than the subbands of the SBFD slot. For example, an uplink BWP may span some or all of the uplink subband (e.g., overlap with) and extend into RB(s) of the downlink subband. A downlink BWP may span some or all of the downlink subband (e.g., overlap with) and extend into RB(s) of the uplink subband. Accordingly, references to a BWP and first subband may include an uplink BWP and uplink subband or to a downlink BWP and a downlink subband. References to a second subband in this context may generally refer to the subband(s) going in the other direction. For example, the second subband may refer to a downlink subband in the uplink BWP/subband scenario or refer to an uplink subband in the downlink BWP/subband scenario.

The network entity may configure the FDRA indication to carry or otherwise convey an indication of the starting RB of at least one RB set in a first subband. It is to be understood that the frequency resources allocated to the communications scheduled in the first subband of the SBFD slot may include a number of RB sets, with the FDRA indication identifying the starting RB. The FDRA indication may also carry or otherwise convey an indication of the number of consecutive RBs allocated for communications in the first subband during the SBFD slot (e.g., a Type 1 FDRA indication).

Accordingly, the UE may identify or otherwise determine the overlap between the BWP and the first subband. For example, the UE may be configured with slot format indicator identifying SBFD slots, as well as uplink and downlink slots. The SBFD slot, accordingly, may be understood to have different subbands. For example, slot configuration 300-a of FIG. 3A illustrates a SBFD slot format with two subbands (one uplink and one downlink) where slot configuration 300-b of FIG. 3B illustrates a SBFD format with three subbands (two downlink and one uplink, in this example). The UE may identify the starting RB of at least one RB set of the RB set(s) allocated for communications in the first subband (e.g., as scheduled by the DCI grant) based on the overlap between the BWP and the first subband. The overlap identifies the frequency resources that are common or shared between the BWP and the first subband. The starting RB of the at least one RB set may be located within the BWP and the first subband, thus identifying the frequency resources allocated for communications in the first subband during the SBFD slot.

In some examples, this may include a DCI scheduling PxSCH (e.g., uplink or downlink communications) in a SBFD slot having a FDRA Type 1 indication for every subband in the slot. For example, the UE may use the FDRA indication to identify or otherwise determine a first FDRA for the first subband and a second FDRA for communications during the SBFD slot in a second subband (e.g., the subband going in the other direction). In slot configuration 300-*a* of FIG. 3A, this may include a first FDRA indication for the uplink subband 305 and a second FDRA indication for the downlink subband 310. In slot configuration 300-*b* of FIG. 3B, this may include a first FDRA indication for downlink subband 320, a second FDRA indication for uplink subband 325, and a third FDRA indication for downlink subband 330. In an example where uplink communications are not being scheduled in uplink subband 325 by the DCI grant and two downlink transmissions are being scheduled, the second FDRA indication may be for downlink subband 330 instead. For example, a DCI grant scheduling PDSCH over two downlink subbands (e.g., downlink subband 320 and downlink subband 330) in a SBFD slot may have a FDRA indication for each subband. Accordingly, in this example the DCI grant may carry or otherwise convey a separate FDRA indication for each subband in the SBFD slot.

In this example and based on the overlap between the first subband and the BWP 315, the number of bits used in the FDRA indications (e.g., the first and second FDRA indications, and third FDRA indication in some examples) may be based, at least to some degree, on the number of RBs in the overlap between the BWP and the first subband. For example, the FDRA field carried or otherwise conveyed in the DCI grant may include a number of bits based on ceil $(\log_2((N_{RB}{}^{SB1})((N_{RB}{}^{SB1}+1)/2)))$+ceil $(\log_2((N_{RB}{}^{SB2})$ $((N_{RB}{}^{SB2}+1)/2)))$, where $N_{RB}{}^{SB1}$ refers to the total number of RBs in BWP 315 that overlap with the first subband (SB1). Accordingly, ceil $(\log_2((N_{RB}{}^{SB1})((N_{RB}{}^{SB1}+1)/2)))$ may be used to carry the RIV indication for the first subband and ceil $(\log_2((N_{RB}{}^{SB2})((N_{RB}{}^{SB2}+1)/2)))$ may be used to carry the RIV indication for the second subband (e.g., a separate FDRA indication for each subband).

In some examples, this may include a DCI scheduling PxSCH (e.g., uplink or downlink communications) in a SBFD slot having a FDRA Type 1 indication that covers resources in all subbands of the SBFD slot. For example, the UE may use the FDRA indication to identify or otherwise determine a shared or common FDRA for the first subband and the second subband (e.g., the subband going in the other direction) during the SBFD slot. In slot configuration 300-*a* of FIG. 3A, this may include a shared FDRA indication for both the uplink subband 305 and the downlink subband 310. In slot configuration 300-*b* of FIG. 3B, this may include the shared FDRA indication for downlink subband 320, for uplink subband 325, and for downlink subband 330. The starting RB of the first subband may be identified based on the shared FDRA indication.

In one option of this example, the shared FDRA indication may include a set of redundant bits (e.g., bits corresponding to RBs in the uplink subband 325 when the grant schedules downlink communications). That is, the bits corresponding to the subband going in the other direction (e.g., an uplink subband when the grant schedules downlink communications, or vice versa) may be considered redundant or otherwise unusable bits.

In another option of this example, the shared FDRA indication may be based on cell $(\log_2((N_{RB}{}^{SB1\cup SB2})$ $((N_{RB}{}^{SB1\cup SB2}+1)/2)))$, where $N_{RB}{}^{SB1\cup SB2}$ identifies the total number of RBs in the BWP 315 that overlap with all the subbands in the SBFD slot, which may include the first subband. The RIV indication may be interpreted such that some of the RBs (e.g., the middle RBs corresponding to the uplink subband 305 or uplink subband 325 when the DCI grant schedules downlink communications in the downlink subbands of the SBFD slot) in the subband cannot be used or are otherwise not accounted for. For example, a starting RB of 0 and the indicated length of consecutive RBs spanning 50 RBs may be interpreted as x RBs may be used in the first subband and 50-x RBs may be used in the second subband.

Accordingly, the UE may receive the FDRA indication carried in the DCI grant (e.g., separate FDRA indications per subband or a shared FDRA indication) and identify or otherwise determine the starting RB and RB set(s) in the first subband to be used for wireless communications.

Figure 4:
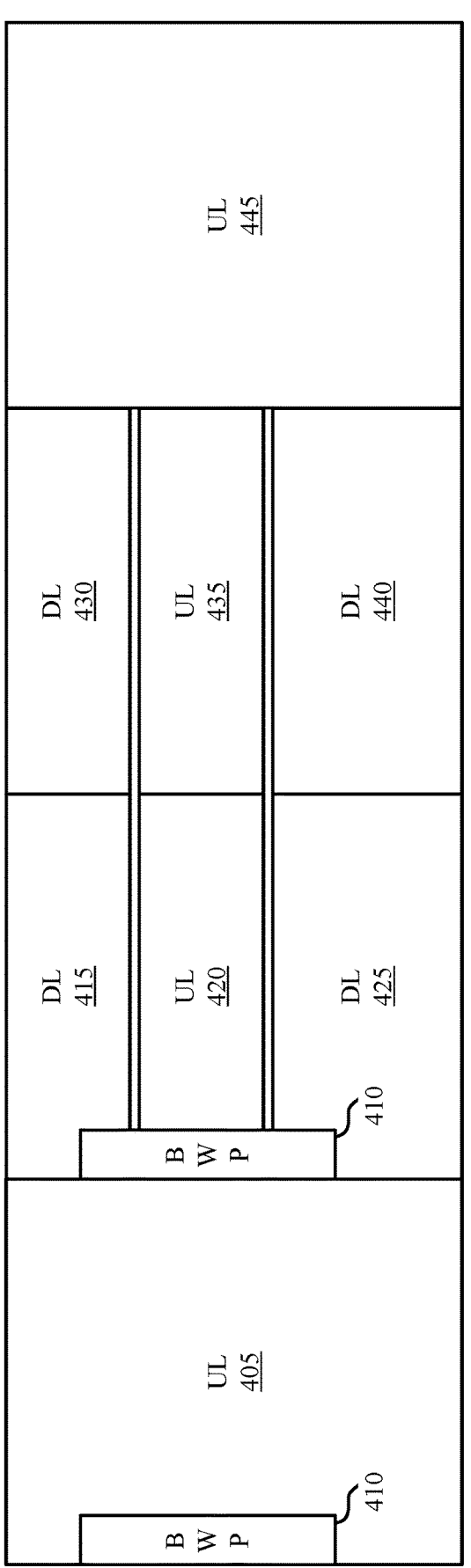
FIG. 4 illustrates an example of a slot configuration that supports frequency resource configurations in full-duplex networks in accordance with one or more aspects of the present disclosure.

FIG. 4 illustrates an example of a slot configuration 400 that supports frequency resource configurations in full-duplex networks in accordance with one or more aspects of the present disclosure. Slot configuration 400 may implement aspects of wireless communications systems 100 or 200 or aspects of slot configuration 300. Aspects of slot configuration 400 may be implemented at or implemented by a UE or network entity, which may be examples of the corresponding devices described herein. Slot configuration 400 illustrates an example having four slots that includes two uplink slots (e.g., uplink slot 405 and uplink slot 445) and two SBFD slots, with each SBFD slot having two, disjointed downlink subbands separated by an uplink subband.

As discussed above, a UE may be configured with a BWP 410 (which may be an uplink BWP in the example illustrated in slot configuration 400) to be used for communications with a network entity. The UE and network entity may perform wireless communications during uplink slot 405 according to BWP 410.

The UE may also be scheduled to perform wireless communications during one or more SBFD slots (with two SBFD slots being shown by way of example only). However, BWP 410 does not change from uplink or downlink slots to SBFD slots. That is, a separate BWP is not typically configured for SBFD slots. Accordingly, the UE and network entity may continue to use the BWP 410 during the SBFD slots. For example, BWP 410 may also be utilized during the SBFD slot containing downlink subband 415, uplink subband 420, and downlink subband 425. BWP 410 may also be utilized during the next SBFD slot containing downlink subband 430, uplink subband 435, and downlink subband 440. It is to be understood that BWP 410 may continue to be utilized during the subsequent SBFD slot as well as during uplink slot 445, unless reconfigured by the network entity for the UE.

The network entity may also transmit or otherwise provide (and the UE may receive or otherwise obtain) a grant scheduling communications in a subband of an SBFD slot. For example, a DCI grant may carry or otherwise convey an indication of a FDRA for the communications during the SBFD slot. According to aspects of the techniques described herein, the FDRA indicated in the grant may be specific to or otherwise be associated with a particular subband of the SBFD slot or to the entirety of the SBFD slot. For example, the FDRA indication may be usable by the UE to identify or otherwise determine at least one of the RB sets in the subband in which the communications are being scheduled. For example and based on BWP 410 having a different bandwidth than the subband, the UE may use the FDRA indication to identify or otherwise determine the starting RB of the RB set in the subband according to the FDRA indication.

That is, the first available RB allocation indicated in the FDRA indication may be considered the first RB (e.g., the starting RB of the first RB set) in the subband. For example, during a FD slot (e.g., the SBFD slot) and when the bandwidth of BWP 410 is greater than that of the subband, the allocation may be based on the subband such that the first available RB for transmission is the first RB in the subband. In the non-limiting example illustrated in FIG. 4 in the uplink context (e.g., BWP 410 is an uplink BWP), this may include the UE receiving an indication of an FDRA where the first available RB indicated in the FDRA indication corresponds to the first RB of uplink subband 420. When the DCI grant schedules the communications across multiple slots, this may include the FDRA indicated in the grant identifying the starting RB of uplink subband 425. During uplink slot 445, the FDRA indicated in the scheduling grant may again be interpreted to indicate the starting RB within the uplink slot 445 (e.g., rather than for an uplink subband).

Accordingly, the UE and network entity may perform communications during the SBFD slot(s) in the subband (e.g., using the at least one RB set including the starting RB). Accordingly, the frequency resources allocated for communications during the SBFD slot may be based on the minimum overlap between the BWP 410 and the subband in the SBFD slot.

Figure 5A:
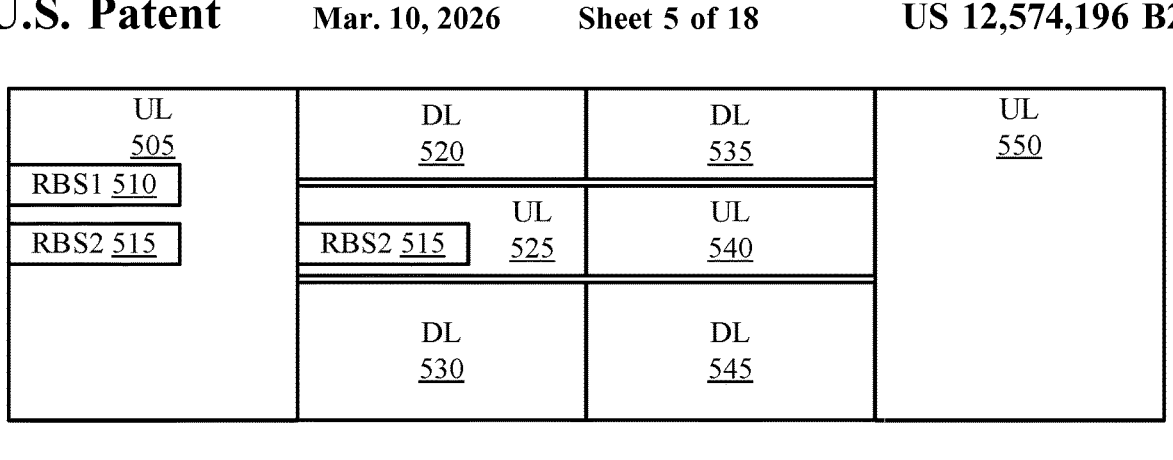
FIGS. 5A-5C illustrate examples of a slot configuration that supports frequency resource configurations in full-duplex networks in accordance with one or more aspects of the present disclosure.
Figure 5B:
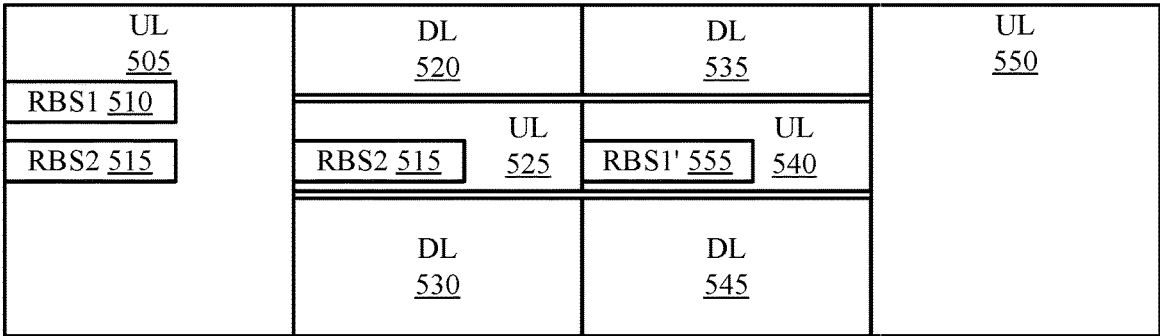
Figure 5B:
Figure 5C:
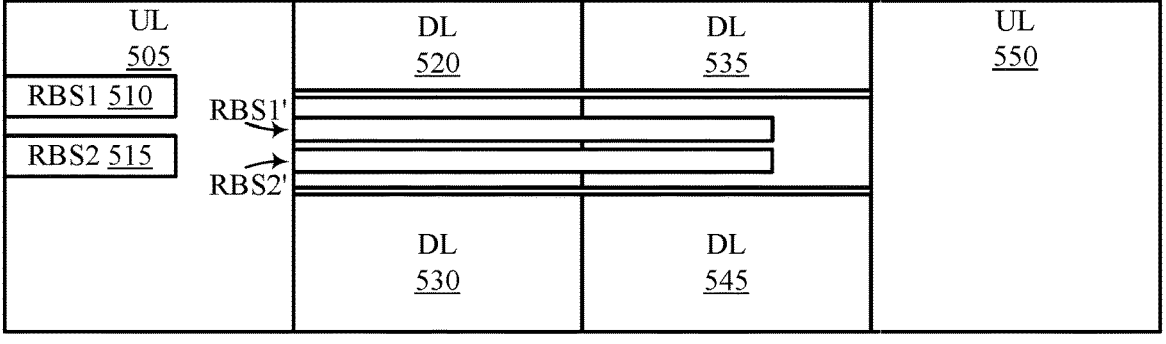

FIGS. 5A-5C illustrate examples of a slot configuration 500 that supports frequency resource configurations in full-duplex networks in accordance with one or more aspects of the present disclosure. Slot configuration 500 may implement aspects of wireless communications systems 100 or 200 or aspects of slot configuration 300 or slot configuration 400. Aspects of slot configuration 500 may be implemented at or implemented by a UE or network entity, which may be examples of the corresponding devices described herein. Slot configuration 500 illustrates an example having four slots that includes two uplink slots (e.g., uplink slot 505 and uplink slot 550) and two SBFD slots, with each SBFD slot having two, disjointed downlink subbands separated by an uplink subband.

As discussed above, a UE may be configured with a BWP (which may be an uplink BWP in the example illustrated in slot configuration 500) to be used for communications with a network entity. The UE and network entity may perform wireless communications during uplink slot 505 according to the BWP.

The UE may also be scheduled to perform wireless communications during one or more SBFD slots (with two SBFD slots being shown by way of example only). However, the BWP does not change from uplink or downlink slots to SBFD slots. That is, a separate BWP is not typically configured for SBFD slots. Accordingly, the UE and network entity may continue to use the BWP during the SBFD slots. For example, the BWP may also be utilized during the SBFD slot containing downlink subband 520, uplink subband 525, and downlink subband 530. It is to be understood that the BWP may continue to be utilized during the subsequent SBFD slot as well as during uplink slot 550, unless reconfigured by the network entity for the UE.

The network entity may also transmit or otherwise provide (and the UE may receive or otherwise obtain) a grant scheduling communications in a subband of an SBFD slot. For example, a DCI grant may carry or otherwise convey an indication of a FDRA for the communications during the SBFD slot. The FDRA indicated in the grant may be specific to or otherwise be associated with a particular subband of the SBFD slot or to the entirety of the SBFD slot. For example, the FDRA indication may be usable by the UE to identify or otherwise determine at least one of the RB sets in the subband in which the communications are being scheduled. For example and based on the BWP having a different bandwidth than the subband, the UE may use the FDRA indication to identify or otherwise determine the starting RB of the at least one RB set in the subband according to the FDRA indication.

Slot configuration 500 illustrates another uplink example where the UE and network entity continue to interpret the FDRA allocation in terms of the uplink subband of the SBFD slot (e.g., uplink subband 525, uplink subband 540, or both) based on a configured uplink BWP. Again, a configured uplink BWP is not changed from uplink slots to SBFD slots.

Slot configuration 500 illustrates an example where the UE is configured to perform two uplink transmissions using two RB sets (RBSs). For example, the UE may be scheduled to perform a first uplink transmission using RB set 510 and a second uplink transmission using RB set 515 during uplink slot 505. RB set 510, RB set 515, or both, may include or otherwise span more than one RB sets configured for the communications. RB set 510 and RB set 515 may be within the uplink BWP configured for the UE. The UE may also be scheduled to perform the two uplink transmissions using RB set 510 and RB set 515 during one or more subsequent SBFD slots, which continue to use the uplink BWP for FDRA interpretation. However, as is illustrated in slot configuration 500 some or all of RB set 510 allocated for uplink transmissions may span or otherwise overlap with downlink subband 520 (or with downlink subband 535 during the next SBFD slot). Thus, during the SBFD slots one or more of the RBs in SB 510 may overlap with a second subband, which may correspond to downlink subband 520 in this example. The downlink subband 545 of the second SBFD slot may go unused or may be used for a different downlink transmission by the UE or another UE.

In an SBFD slot when the UE is configured to transmit PUxCH using two RB sets (e.g., RB set 510 and RB set 515) and where each RB set is configured by its own parameter, when the transmission occurs in a SBFD slot various options may be adopted to address the overlap between RB set 510 and downlink subband 520 during the SBFD slot.

Slot configuration 500-a of FIG. 5A illustrates a non-limiting example of a first option where when one RB set overlaps with a downlink subband in a FD slot, the RB set is dropped. For example, the UE may identify or otherwise determine that one or more RB sets in the subband (e.g., the band of frequency resources scheduled during a HD slot) overlaps with a second subband of the SBFD slot. The UE may therefore drop the overlapping RB sets for the communications during the SBFD slot. As shown in slot configuration 500-a, this may include the UE performing the uplink transmission using RB set 515 during the SBFD slot but dropping the uplink transmission using RB set 510 due to the overlap.

Slot configuration 500-b of FIG. 5B illustrates a non-limiting example of a second option where when one RB set overlaps with a downlink subband in a FD slot, the UE applies slot aggregation and transmits each RB set over one FD slot. For example, the UE may identify or otherwise determine that one or more RB sets in the subband (e.g., the band of frequency resources scheduled during a HD slot) overlaps with a second subband of the SBFD slot. The UE may therefore perform the communications using both RB sets, but in subsequent SBFD slots. As shown in slot configuration 500-b, this may include the UE performing the uplink transmission using RB set 515 during the first SBFD slot and then performing the uplink transmission using RB set 510 during the next slot due to the overlap. In this context, this may include the UE modifying the RB set 510 to obtain a modified RB set (e.g., RBS1' 555) to use during the second SBFD slot (e.g., to support the slot aggregation).

Slot configuration 500-c of FIG. 5C illustrates a non-limiting example of a third option where when one RB set overlaps with a downlink subband in a FD slot, the UE is allowed to spread the RB set over more OFDM symbols (if available) to reduce the number of allocated RBs. For example, the UE may identify or otherwise determine that one or more RB sets in the subband (e.g., the band of frequency resources scheduled during a HD slot) overlaps with a second subband of the SBFD slot. The UE may therefore modify one or more of RB set 510 and RB set 515 to obtain modified RB sets (e.g., RBS1' and RBS2'). The UE and network entity may use the modified RB sets to perform the communications during the SBFD slot (and subsequent SBFD slots when extended beyond the current SBFD slot). As shown in slot configuration 500-c, this may include the UE performing both uplink transmissions using the modified version of RB set 510 (e.g., RBS1') and the modified version of RB set 515 (e.g., RBS2') during the first SBFD slot and into the next SBFD slot due to the overlap. In some aspects, extending the uplink transmissions in the time domain may be limited to one SBFD slot or to more than one SBFD slots.

Figure 6:
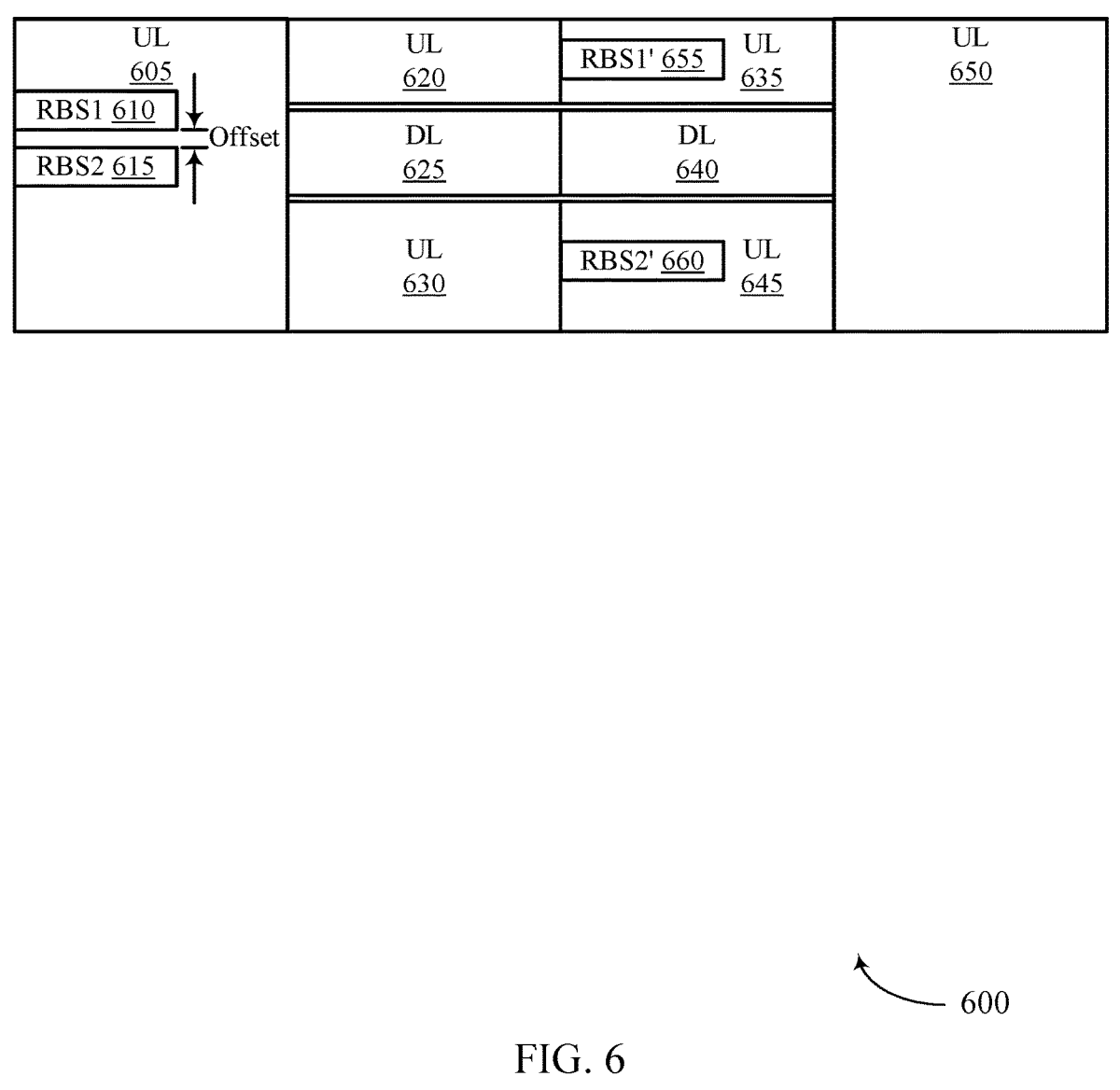

FIG. 6 illustrates an example of a slot configuration 600 that supports frequency resource configurations in full-duplex networks in accordance with one or more aspects of the present disclosure. Slot configuration 600 may implement aspects of wireless communications systems 100 or 200 or aspects of slot configuration 300, slot configuration 400, or slot configuration 500. Aspects of slot configuration 600 may be implemented at or implemented by a UE or network entity, which may be examples of the corresponding devices described herein. Slot configuration 600 illustrates an example having four slots that includes two uplink slots (e.g., uplink slot 605 and uplink slot 650) and two SBFD slots, with each SBFD slot having two, disjointed uplink subbands separated by a downlink subband.

As discussed above, a UE may be configured with a BWP (which may be an uplink BWP in the example illustrated in slot configuration 600) to be used for communications with a network entity. The UE and network entity may perform wireless communications during uplink slot 605 according to the BWP.

The UE may also be scheduled to perform wireless communications during one or more SBFD slots (with two SBFD slots being shown by way of example only). However, the BWP does not change from uplink or downlink slots to SBFD slots. That is, a separate BWP is not typically configured for SBFD slots. Accordingly, the UE and network entity may continue to use the BWP during the SBFD slots. For example, the BWP may also be utilized during the SBFD slot containing uplink subband 620, downlink subband 625, and uplink subband 630. The BWP may also be utilized during the SBFD slot containing uplink subband 635, downlink subband 640, and uplink subband 645. It is to be understood that the BWP may continue to be utilized during uplink slot 650, unless reconfigured by the network entity for the UE.

The network entity may also transmit or otherwise provide (and the UE may receive or otherwise obtain) a grant scheduling communications in a subband of an SBFD slot. For example, a DCI grant may carry or otherwise convey an indication of a FDRA for the communications during the SBFD slot. The FDRA indicated in the grant may be specific to or otherwise be associated with a particular subband of the SBFD slot or to the entirety of the SBFD slot. For example, the FDRA indication may be usable by the UE to identify or otherwise determine at least one of the RB sets in the subband in which the communications are being scheduled. For example and based on the BWP having a different bandwidth than the subband, the UE may use the FDRA indication to identify or otherwise determine the starting RB of the at least one RB set in the subband according to the FDRA indication.

Slot configuration 600 illustrates another uplink example where the UE and network entity continue to interpret the FDRA allocation in terms of the uplink subband of the SBFD slot (e.g., uplink subband 620, uplink subband 630, uplink subband 635, or uplink subband 645) based on a configured uplink BWP. Again, a configured uplink BWP is not changed from uplink slots to SBFD slots.

Slot configuration 600 illustrates an example where the UE is configured to perform two uplink transmissions using two RB sets (RBSs). For example, the UE may be scheduled to perform a first uplink transmission using RB set 610 and a second uplink transmission using RB set 615 during uplink slot 605. RB set 610, RB set 615, or both, may include or otherwise span more than one RB sets configured for the communications. RB set 610 and RB set 615 may be within the uplink BWP configured for the UE. The UE may also be scheduled to perform the two uplink transmissions using RB set 610 and RB set 615 during one or more subsequent SBFD slots, which continue to use the uplink BWP for FDRA interpretation. However, as is illustrated in slot configuration 600 all of RB set 615 and some or all of RB set 610 allocated for uplink transmissions may span or otherwise overlap with downlink subband 625 (or with downlink subband 640 during the next SBFD slot). Thus, during the SBFD slots one or more of the RBs in RB set 615 and RB set 610 may overlap with a second subband, which may correspond to downlink subband 625 in the first SBFD slot and to downlink subband 625 in the second SBFD slot in this example.

In an SBFD slot when the UE is configured to transmit PUxCH using two RB sets (e.g., RB set 610 and RB set 615) and where each RB set is configured by its own parameter, when the transmission occurs in a SBFD slot the UE may address the overlap between RB set 610 and RB set 615 and downlink subband 625 and downlink subband 640 during the SBFD slots.

That is, slot configuration 600 illustrates an example in a SBFD slot with two, disjointed subbands, one RB set can be configured according to a Type 1 or Type 2 resource allocation while the second RB set can be indicated as with an offset relative to the first RB set. For example, the UE may identify or otherwise determine the offset between the at least one RB set (e.g., RB set 610) and a second RB set (e.g., RB set 615), where the offset identifies the offsets in disjointed subbands (e.g., the RB sets offset in the subband that is a disjointed subband). As one non-limiting example, this may include the RB offset in the SBFD slot with two, disjointed uplink subbands being signaled, identified, or otherwise obtained based on: RB_offset_SBFD_2ULbands=RB_offset_UL slot+Number of RBs in DL sub-band+Number of RBs in the guard or gap band. That is, the offset may correspond to the RB offset indicated for uplink slot 605 plus the number of RBs in the downlink subband 625 (or downlink subband 640 in the next SBFD slot) plus any RBs allocated to a guard or gap band(s) between adjacent subbands of the SBFD slot. The UE and network entity may use the FDRA indication to identify the starting RB of the uplink subband 645 in the second SBFD slot to obtain a modified RB set (e.g., RBS2' 660, corresponding to original RB set 615) and use the offset to identify the starting RB of the uplink subband 635 to obtain a modified RB set (e.g., RBS1' 655, corresponding to original RB set 610).

Accordingly, the UE and network entity may perform the communications during the SBFD slot using at least one RB set (e.g., RBS1' 655) in uplink subband 635 and using the second RB set (e.g., RBS2' 660) in uplink subband 645 based on the disjointed subbands.

Figure 7:
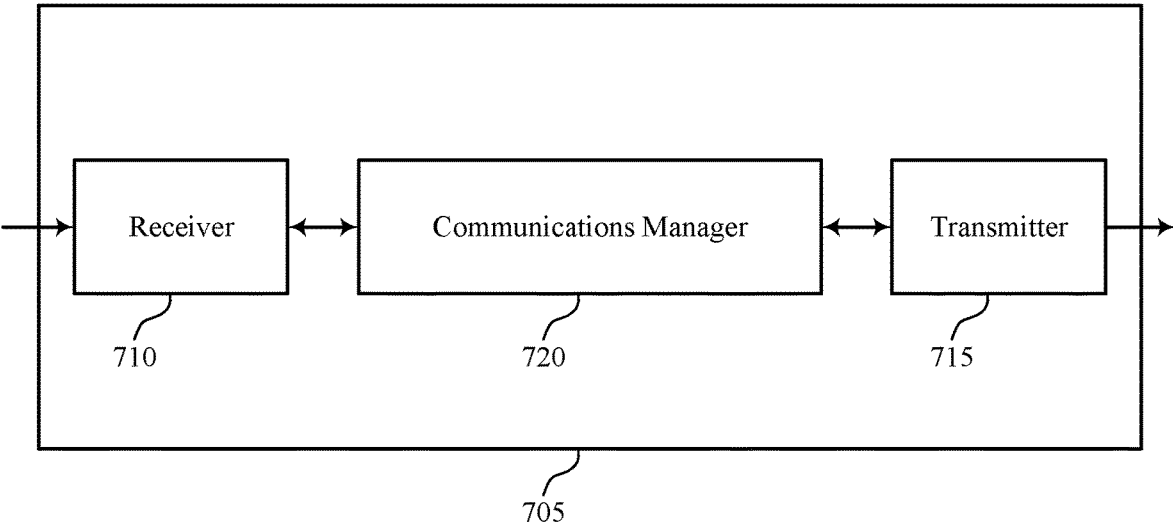
FIGS. 7 and 8 show block diagrams of devices that support frequency resource configurations in full-duplex networks in accordance with one or more aspects of the present disclosure.

FIG. 7 shows a block diagram 700 of a device 705 that supports frequency resource configurations in full-duplex networks in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to frequency resource configurations in full-duplex networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to frequency resource configurations in full-duplex networks). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of frequency resource configurations in full-duplex networks as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry), in software (e.g., executed by a processor, or any combination thereof. The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving an indication of a FDRA for communications associated with a SBFD slot. The communications manager 720 may be configured as or otherwise support a means for identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP. The communications manager 720 may be configured as or otherwise support a means for performing the communications during the SBFD slot in the first subband using the at least one RB set.

Additionally, or alternatively, the communications manager 720 may support wireless communication at a UE in accordance with examples as disclosed herein. For example, the communications manager 720 may be configured as or otherwise support a means for receiving an indication of a FDRA for communications associated with a SBFD slot, where the FDRA is specific to a subband of the SBFD slot or an entirety of the SBFD slot. The communications manager 720 may be configured as or otherwise support a means for identifying, based on the FDRA, at least one RB set in a subband of the SBFD slot. The communications manager 720 may be configured as or otherwise support a means for performing communications during the SBFD slot in the subband using the at least one RB set.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for improved FDRA signaling techniques to support allocating frequency resources relative to one or more subbands of SBFD slots.

Figure 8:
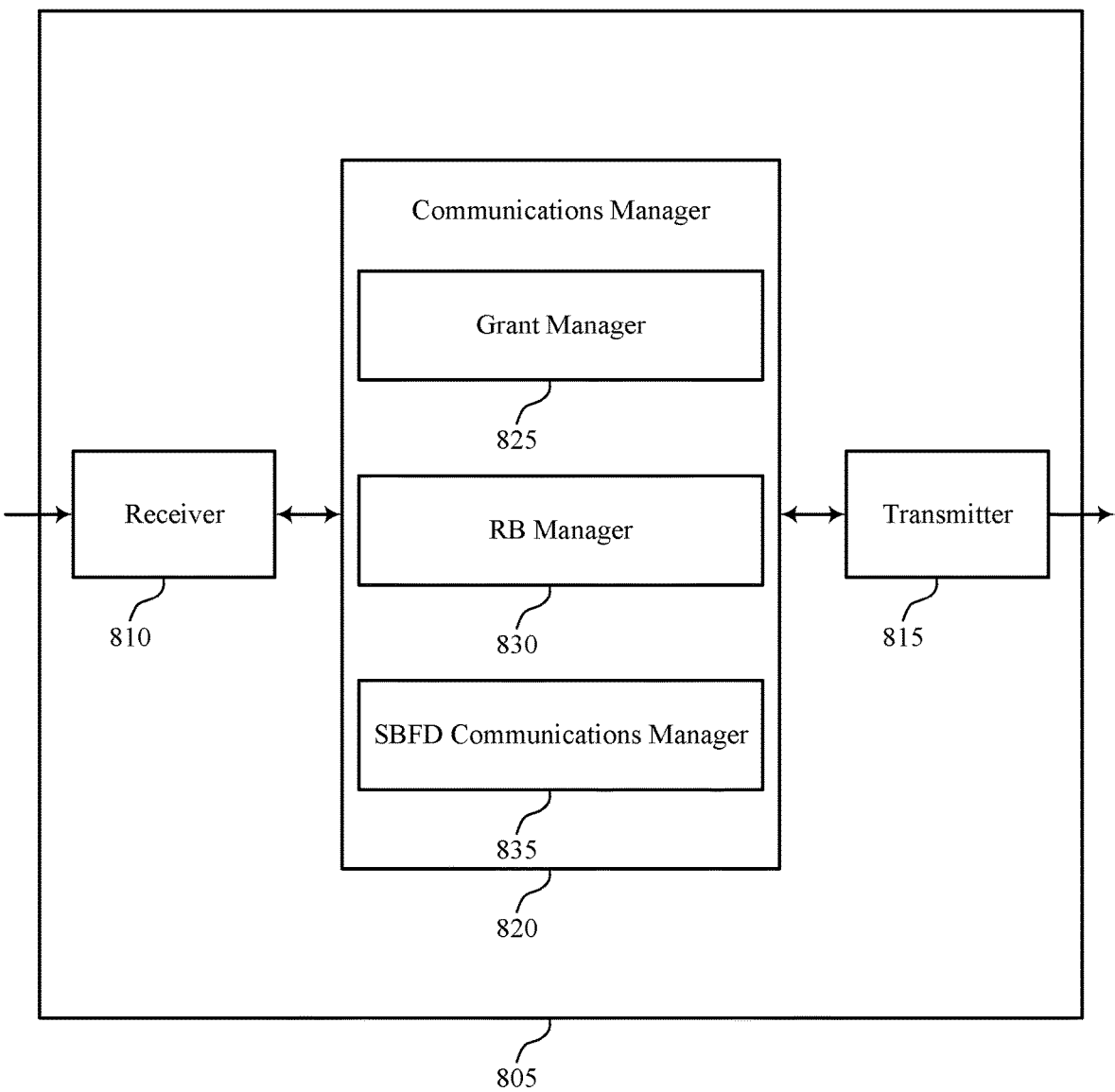

FIG. 8 shows a block diagram 800 of a device 805 that supports frequency resource configurations in full-duplex networks in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency resource configurations in full-duplex networks). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency resource configurations in full-duplex networks). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of frequency resource configurations in full-duplex networks as described herein. For example, the communications manager 820 may include a grant manager 825, an RB manager 830, an SBFD communications manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The grant manager 825 may be configured as or otherwise support a means for receiving an indication of a FDRA for communications associated with a SBFD slot. The RB manager 830 may be configured as or otherwise support a means for identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP. The SBFD communications manager 835 may be configured as or otherwise support a means for performing the communications during the SBFD slot in the first subband using the at least one RB set.

Additionally, or alternatively, the communications manager 820 may support wireless communication at a UE in accordance with examples as disclosed herein. The grant manager 825 may be configured as or otherwise support a means for receiving an indication of a FDRA for communications associated with a SBFD slot, where the FDRA is specific to a subband of the SBFD slot or an entirety of the SBFD slot. The RB manager 830 may be configured as or otherwise support a means for identifying, based on the FDRA, at least one RB set in a subband of the SBFD slot. The SBFD communications manager 835 may be configured as or otherwise support a means for performing communications during the SBFD slot in the subband using the at least one RB set.

Figure 9:
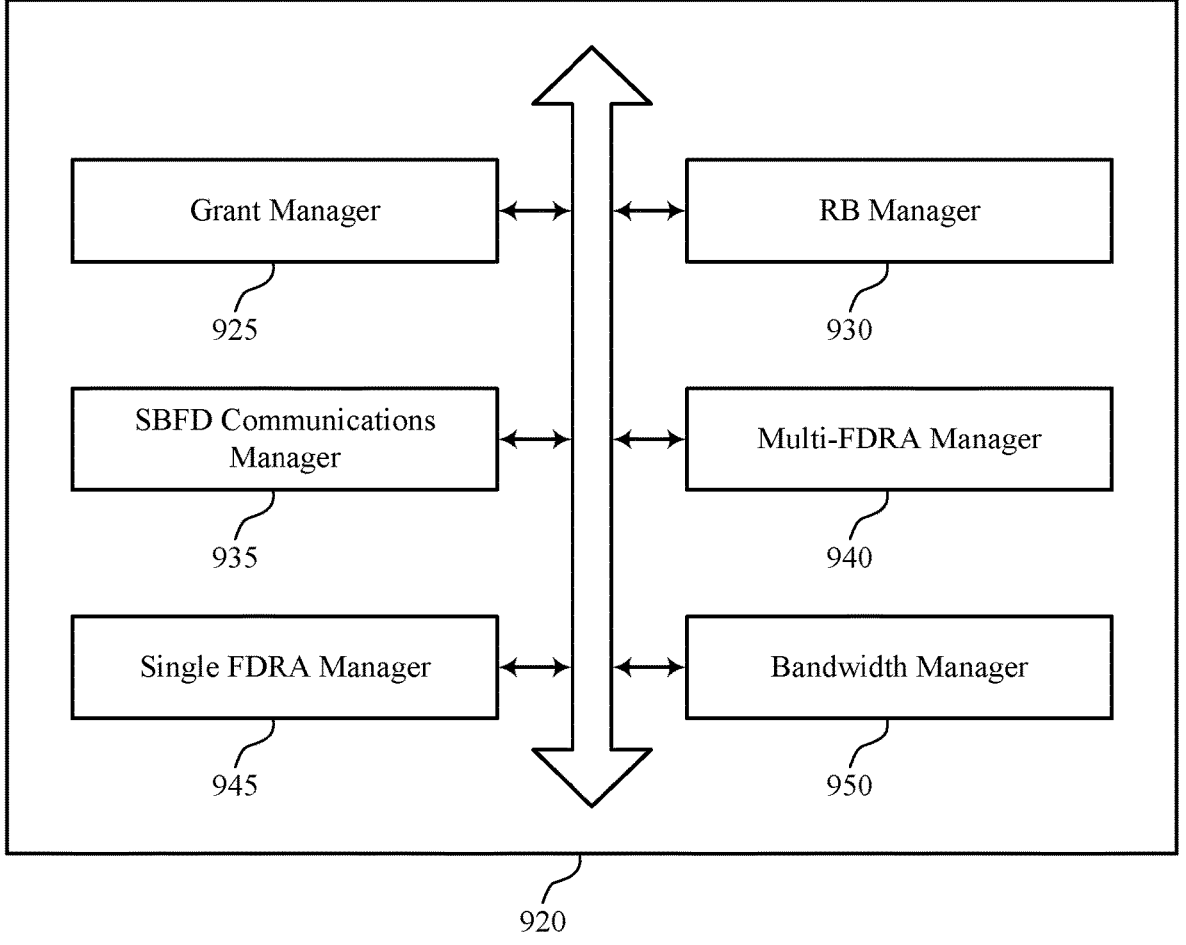
FIG. 9 shows a block diagram of a communications manager that supports frequency resource configurations in full-duplex networks in accordance with one or more aspects of the present disclosure.

FIG. 9 shows a block diagram 900 of a communications manager 920 that supports frequency resource configurations in full-duplex networks in accordance with one or more aspects of the present disclosure. The communications manager 920 may be an example of aspects of a communications manager 720, a communications manager 820, or both, as described herein. The communications manager 920, or various components thereof, may be an example of means for performing various aspects of frequency resource configurations in full-duplex networks as described herein. For example, the communications manager 920 may include a grant manager 925, an RB manager 930, an SBFD communications manager 935, a multi-FDRA manager 940, a single FDRA manager 945, a bandwidth manager 950, or any combination thereof. Each of these components may communicate, directly or indirectly, with one another (e.g., via one or more buses).

The communications manager 920 may support wireless communication at a UE in accordance with examples as disclosed herein. The grant manager 925 may be configured as or otherwise support a means for receiving an indication of a FDRA for communications associated with a SBFD slot. The RB manager 930 may be configured as or otherwise support a means for identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP. The SBFD communications manager 935 may be configured as or otherwise support a means for performing the communications during the SBFD slot in the first subband using the at least one RB set.

In some examples, the multi-FDRA manager 940 may be configured as or otherwise support a means for identifying, based on the indication of the FDRA, a first FDRA for the first subband and a second FDRA for communications in a second subband, where the starting RB of the at least one RB set is identified based on the first FDRA. In some examples, a number of bits in the first FDRA and the second FDRA is based on a number of RBs in the overlap between the BWP and the first subband of the SBFD slot. In some examples, the indication includes a separate FDRA for each subband in the SBFD slot.

In some examples, the single FDRA manager 945 may be configured as or otherwise support a means for identifying, based on the indication of the FDRA, a shared FDRA for the first subband and a second subband in the SBFD slot, where the starting RB of the at least one RB set is identified based on the shared FDRA. In some examples, the shared FDRA includes a set of redundant bits associated with the first subband. In some examples, the shared FDRA includes a number of bits that are based on a number of RBs in the overlap between the BWP and the first subband of the SBFD slot. In some examples, the shared FDRA includes an indication of the starting RB and a total number of RBs in the at least one RB set.

Additionally, or alternatively, the communications manager 920 may support wireless communication at a UE in accordance with examples as disclosed herein. In some examples, the grant manager 925 may be configured as or otherwise support a means for receiving an indication of a FDRA for communications associated with a SBFD slot, where the FDRA is specific to a subband of the SBFD slot or an entirety of the SBFD slot. In some examples, the RB manager 930 may be configured as or otherwise support a means for identifying, based on the FDRA, at least one RB set in a subband of the SBFD slot. In some examples, the SBFD communications manager 935 may be configured as or otherwise support a means for performing communications during the SBFD slot in the subband using the at least one RB set.

In some examples, the bandwidth manager 950 may be configured as or otherwise support a means for identifying, based on a different bandwidth of a BWP relative to the subband of the SBFD slot, a starting RB of the at least one RB set in the subband according to the FDRA. In some examples, the bandwidth manager 950 may be configured as or otherwise support a means for identifying one or more RB sets in the subband that overlap with a second subband of the SBFD slot. In some examples, the bandwidth manager 950 may be configured as or otherwise support a means for dropping the one or more RB sets for the communications based on the overlap with the second subband.

In some examples, the bandwidth manager 950 may be configured as or otherwise support a means for identifying a second RB set in the subband that overlaps with a second subband of the SBFD slot. In some examples, the bandwidth manager 950 may be configured as or otherwise support a means for performing the communication during the SBFD slot using the at least one RB set and communications during a second SBFD slot using the second RB set based on the overlap with the second subband.

In some examples, the bandwidth manager 950 may be configured as or otherwise support a means for identifying a second RB set in the subband that overlaps with a second subband of the SBFD slot. In some examples, the bandwidth manager 950 may be configured as or otherwise support a means for modifying the at least one RB set and the second RB set based on the overlap. In some examples, the bandwidth manager 950 may be configured as or otherwise support a means for performing the communication during the SBFD slot using the modified at least one RB set and second RB set.

In some examples, the bandwidth manager 950 may be configured as or otherwise support a means for identifying a second RB set in the subband that overlaps with a second subband of the SBFD slot. In some examples, the bandwidth manager 950 may be configured as or otherwise support a means for identifying an offset between the at least one RB set and the second RB set, where the offset identifies RB sets offset in the subband that is a disjointed subband. In some examples, the bandwidth manager 950 may be configured as or otherwise support a means for performing the communication during the SBFD slot using the at least one RB set and the second RB set based on the disjointed subband.

Figure 10:
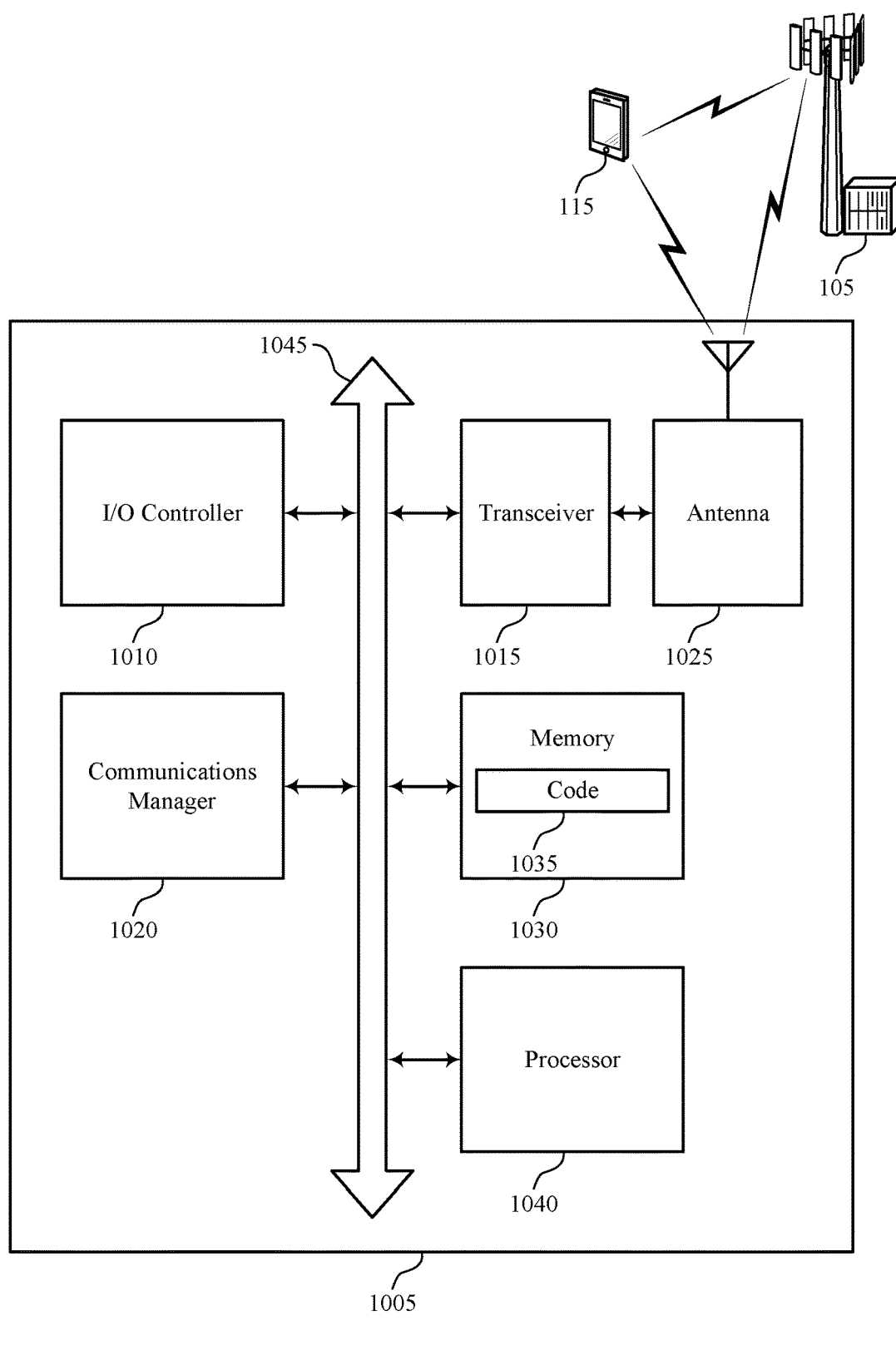
FIG. 10 shows a diagram of a system including a device that supports frequency resource configurations in full-duplex networks in accordance with one or more aspects of the present disclosure.

FIG. 10 shows a diagram of a system 1000 including a device 1005 that supports frequency resource configurations in full-duplex networks in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting frequency resource configurations in full-duplex networks). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an indication of a FDRA for communications associated with a SBFD slot. The communications manager 1020 may be configured as or otherwise support a means for identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP. The communications manager 1020 may be configured as or otherwise support a means for performing the communications during the SBFD slot in the first subband using the at least one RB set.

Additionally, or alternatively, the communications manager 1020 may support wireless communication at a UE in accordance with examples as disclosed herein. For example, the communications manager 1020 may be configured as or otherwise support a means for receiving an indication of a FDRA for communications associated with a SBFD slot, where the FDRA is specific to a subband of the SBFD slot or an entirety of the SBFD slot. The communications manager 1020 may be configured as or otherwise support a means for identifying, based on the FDRA, at least one RB set in a subband of the SBFD slot. The communications manager 1020 may be configured as or otherwise support a means for performing communications during the SBFD slot in the subband using the at least one RB set.

By including or configuring the communications manager 1020 in accordance with examples as described herein, the device 1005 may support techniques for improved FDRA signaling techniques to support allocating frequency resources relative to one or more subbands of SBFD slots.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of frequency resource configurations in full-duplex networks as described herein, or the processor 1040 and the memory 1030 may be otherwise configured to perform or support such operations.

Figure 11:
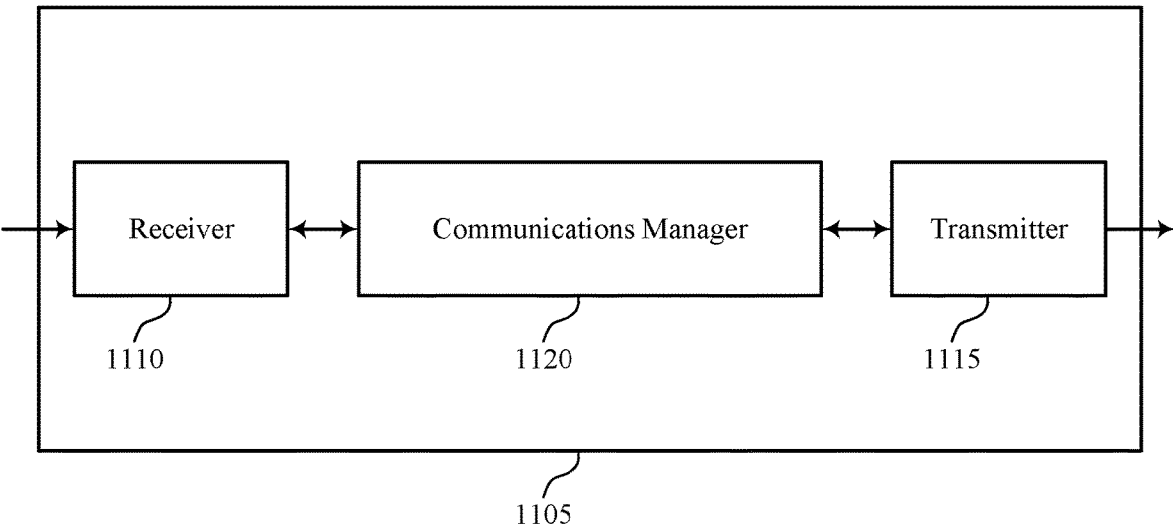
FIGS. 11 and 12 show block diagrams of devices that support frequency resource configurations in full-duplex networks in accordance with one or more aspects of the present disclosure.

FIG. 11 shows a block diagram 1100 of a device 1105 that supports frequency resource configurations in full-duplex networks in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of frequency resource configurations in full-duplex networks as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry), in software (e.g., executed by a processor), or any combination thereof. The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP. The communications manager 1120 may be configured as or otherwise support a means for performing the communications during the SBFD slot in the first subband using the at least one RB set.

Additionally, or alternatively, the communications manager 1120 may support wireless communication at a network entity in accordance with examples as disclosed herein. For example, the communications manager 1120 may be configured as or otherwise support a means for transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot. The communications manager 1120 may be configured as or otherwise support a means for performing communications during the SBFD slot in the subband using the at least one RB set.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for improved FDRA signaling techniques to support allocating frequency resources relative to one or more subbands of SBFD slots.

Figure 12:
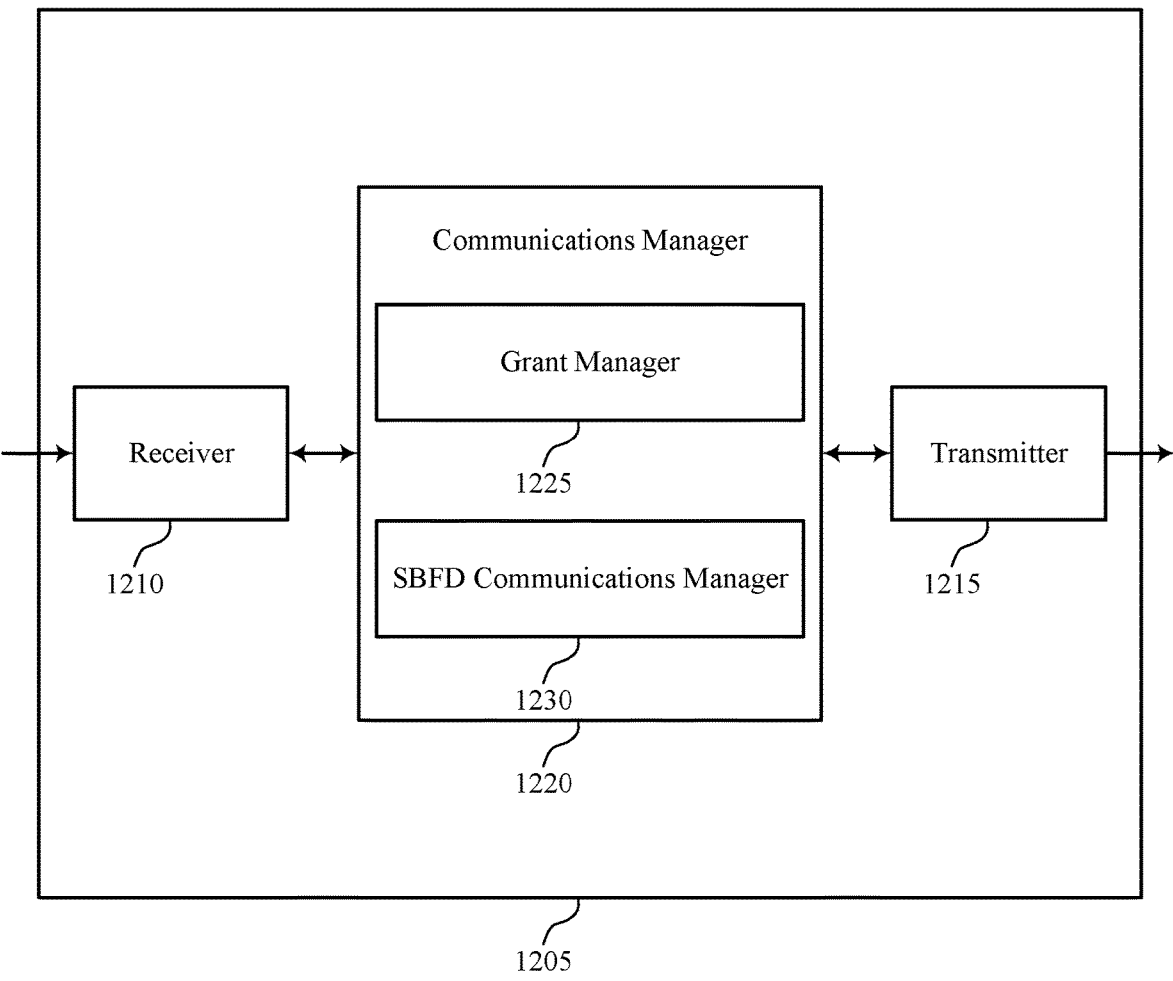
Figure 12:
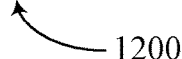

FIG. 12 shows a block diagram 1200 of a device 1205 that supports frequency resource configurations in full-duplex networks in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of frequency resource configurations in full-duplex networks as described herein. For example, the communications manager 1220 may include a grant manager 1225 an SBFD communications manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The grant manager 1225 may be configured as or otherwise support a means for transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP. The SBFD communications manager 1230 may be configured as or otherwise support a means for performing the communications during the SBFD slot in the first subband using the at least one RB set.

Additionally, or alternatively, the communications manager 1220 may support wireless communication at a network entity in accordance with examples as disclosed herein. The grant manager 1225 may be configured as or otherwise support a means for transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot. The SBFD communications manager 1230 may be configured as or otherwise support a means for performing communications during the SBFD slot in the subband using the at least one RB set.

Figure 13:
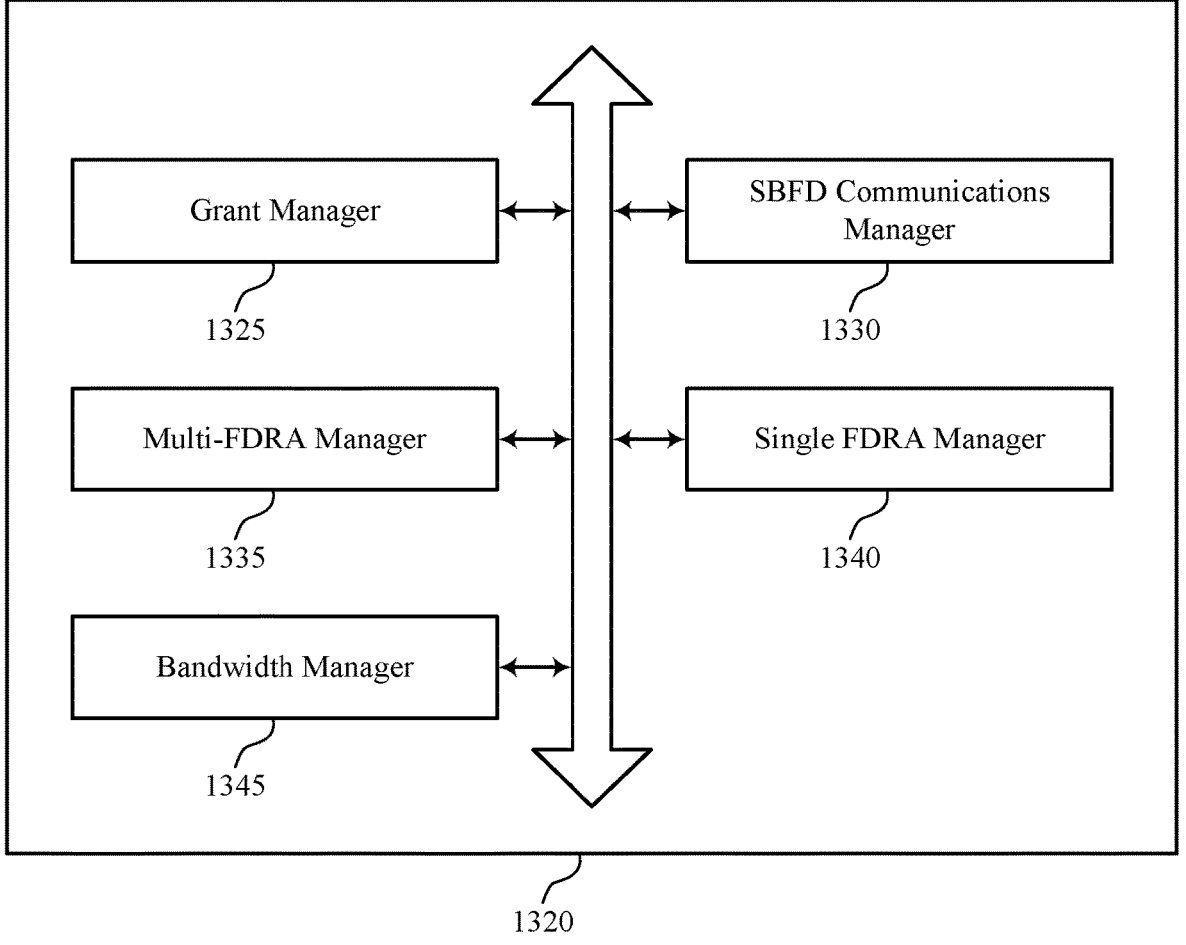
FIG. 13 shows a block diagram of a communications manager that supports frequency resource configurations in full-duplex networks in accordance with one or more aspects of the present disclosure.

FIG. 13 shows a block diagram 1300 of a communications manager 1320 that supports frequency resource configurations in full-duplex networks in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of frequency resource configurations in full-duplex networks as described herein. For example, the communications manager 1320 may include a grant manager 1325, an SBFD communications manager 1330, a multi-FDRA manager 1335, a single FDRA manager 1340, a bandwidth manager 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The grant manager 1325 may be configured as or otherwise support a means for transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP. The SBFD communications manager 1330 may be configured as or otherwise support a means for performing the communications during the SBFD slot in the first subband using the at least one RB set.

In some examples, the multi-FDRA manager 1335 may be configured as or otherwise support a means for identifying, based on the indication of the FDRA, a first FDRA for the first subband and a second FDRA for communications in a second subband, where the starting RB of the at least one RB set is identified based on the first FDRA. In some examples, a number of bits in the first FDRA and the second FDRA is based on a number of RBs in the overlap between the BWP and the first subband of the SBFD slot. In some examples, the indication includes a separate FDRA for each subband in the SBFD slot.

In some examples, the single FDRA manager 1340 may be configured as or otherwise support a means for identifying, based on the indication of the FDRA, a shared FDRA for the first subband and a second subband in the SBFD slot, where the starting RB of the at least one RB set is identified based on the shared FDRA. In some examples, the shared FDRA includes a set of redundant bits associated with the first subband. In some examples, the shared FDRA includes a number of bits that are based on a number of RBs in the overlap between the BWP and the first subband of the SBFD slot. In some examples, the shared FDRA includes an indication of the starting RB and a total number of RBs in the at least one RB set.

Additionally, or alternatively, the communications manager 1320 may support wireless communication at a network entity in accordance with examples as disclosed herein. In some examples, the grant manager 1325 may be configured as or otherwise support a means for transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot. In some examples, the SBFD communications manager 1330 may be configured as or otherwise support a means for performing communications during the SBFD slot in the subband using the at least one RB set.

In some examples, the bandwidth manager 1345 may be configured as or otherwise support a means for identifying, based on a different bandwidth of the BWP relative to the subband of the SBFD slot, a starting RB of the at least one RB set in the subband according to the FDRA. In some examples, the bandwidth manager 1345 may be configured as or otherwise support a means for identifying one or more RB sets in the subband that overlap with a second subband of the SBFD slot. In some examples, the bandwidth manager 1345 may be configured as or otherwise support a means for dropping the one or more RB sets for the communications based on the overlap with the second subband.

In some examples, the bandwidth manager 1345 may be configured as or otherwise support a means for identifying a second RB set in the subband that overlaps with a second subband of the SBFD slot. In some examples, the bandwidth manager 1345 may be configured as or otherwise support a means for performing the communication during the SBFD slot using the at least one RB set and communications during a second SBFD slot using the second RB set based on the overlap with the second subband.

In some examples, the bandwidth manager 1345 may be configured as or otherwise support a means for identifying a second RB set in the subband that overlaps with a second subband of the SBFD slot. In some examples, the bandwidth manager 1345 may be configured as or otherwise support a means for modifying the at least one RB set and the second RB set based on the overlap. In some examples, the bandwidth manager 1345 may be configured as or otherwise support a means for performing the communication during the SBFD slot using the modified at least one RB set and second RB set.

In some examples, the bandwidth manager 1345 may be configured as or otherwise support a means for identifying a second RB set in the subband that overlaps with a second subband of the SBFD slot. In some examples, the bandwidth manager 1345 may be configured as or otherwise support a means for identifying an offset between the at least one RB set and the second RB set, where the offset identifies RB sets offset in the subband that is a disjointed subband. In some examples, the bandwidth manager 1345 may be configured as or otherwise support a means for performing the communication during the SBFD slot using the at least one RB set and the second RB set based on the disjointed subband.

Figure 14:
FIG. 14 shows a diagram of a system including a device that supports frequency resource configurations in full-duplex networks in accordance with one or more aspects of the present disclosure.

FIG. 14 shows a diagram of a system 1400 including a device 1405 that supports frequency resource configurations in full-duplex networks in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting frequency resource configurations in full-duplex networks). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP. The communications manager 1420 may be configured as or otherwise support a means for performing the communications during the SBFD slot in the first subband using the at least one RB set.

Additionally, or alternatively, the communications manager 1420 may support wireless communication at a network entity in accordance with examples as disclosed herein. For example, the communications manager 1420 may be configured as or otherwise support a means for transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot. The communications manager 1420 may be configured as or otherwise support a means for performing communications during the SBFD slot in the subband using the at least one RB set.

By including or configuring the communications manager 1420 in accordance with examples as described herein, the device 1405 may support techniques for improved FDRA signaling techniques to support allocating frequency resources relative to one or more subbands of SBFD slots improved FDRA signaling techniques to support allocating frequency resources relative to one or more subbands of SBFD slots.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of frequency resource configurations in full-duplex networks as described herein, or the processor 1435 and the memory 1425 may be otherwise configured to perform or support such operations.

FIG. 15 shows a flowchart illustrating a method 1500 that supports frequency resource configurations in full-duplex networks in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a FDRA for communications associated with a SBFD slot. The operations of 1505 may be performed in accordance with examples as disclosed herein. In some examples, aspects of the operations of 1505 may be performed by a grant manager 925 as described with reference to FIG. 9.

At 1510, the method may include identifying, based on an overlap between a BWP associated with the communications and a first subband of the SBFD slot, a starting RB within the first subband of the SBFD slot of at least one RB set associated with the FDRA, where the first subband of the SBFD slot has a different bandwidth than the BWP. The operations of 1510 may be performed in accordance with examples as disclosed herein. In some examples, aspects of the operations of 1510 may be performed by an RB manager 930 as described with reference to FIG. 9.

At 1515, the method may include performing the communications during the SBFD slot in the first subband using the at least one RB set. The operations of 1515 may be performed in accordance with examples as disclosed herein. In some examples, aspects of the operations of 1515 may be performed by an SBFD communications manager 935 as described with reference to FIG. 9.

FIG. 16 shows a flowchart illustrating a method 1600 that supports frequency resource configurations in full-duplex networks in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving an indication of a FDRA for communications associated with a SBFD slot, where the FDRA is specific to a subband of the SBFD slot or an entirety of the SBFD slot. The operations of 1605 may be performed in accordance with examples as disclosed herein. In some examples, aspects of the operations of 1605 may be performed by a grant manager 925 as described with reference to FIG. 9.

At 1610, the method may include identifying, based on the FDRA, at least one RB set in a subband of the SBFD slot. The operations of 1610 may be performed in accordance with examples as disclosed herein. In some examples, aspects of the operations of 1610 may be performed by an RB manager 930 as described with reference to FIG. 9.

At 1615, the method may include performing communications during the SBFD slot in the subband using the at least one RB set. The operations of 1615 may be performed in accordance with examples as disclosed herein. In some examples, aspects of the operations of 1615 may be performed by an SBFD communications manager 935 as described with reference to FIG. 9.

FIG. 17 shows a flowchart illustrating a method 1700 that supports frequency resource configurations in full-duplex networks in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting an indication of a FDRA for communications associated with a SBFD slot, the FDRA identifying, based on an overlap between a BWP associated with the communications and a first subband of the SBFD slot, a starting RB within the first subband of the SBFD slot of at least one RB set, where the first subband of the SBFD slot has a different bandwidth than the BWP. The operations of 1705 may be performed in accordance with examples as disclosed herein. In some examples, aspects of the operations of 1705 may be performed by a grant manager 1325 as described with reference to FIG. 13.

At 1710, the method may include performing the communications during the SBFD slot in the first subband using the at least one RB set. The operations of 1710 may be performed in accordance with examples as disclosed herein. In some examples, aspects of the operations of 1710 may be performed by an SBFD communications manager 1330 as described with reference to FIG. 13.

FIG. 18 shows a flowchart illustrating a method 1800 that supports frequency resource configurations in full-duplex networks in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting an indication of a FDRA for communications associated with a SBFD slot, where the FDRA is specific to a subband of the SBFD slot or an entirety of the SBFD slot, the indication of the FDRA identifying, based on the FDRA, at least one RB set in a subband of the SBFD slot. The operations of 1805 may be performed in accordance with examples as disclosed herein. In some examples, aspects of the operations of 1805 may be performed by a grant manager 1325 as described with reference to FIG. 13.

At 1810, the method may include performing communications during the SBFD slot in the subband using the at least one RB set. The operations of 1810 may be performed in accordance with examples as disclosed herein. In some examples, aspects of the operations of 1810 may be performed by an SBFD communications manager 1330 as described with reference to FIG. 13.

The following provides an overview of aspects of the present disclosure:

Aspect 1: A method for wireless communication at a UE, comprising: receiving an indication of a FDRA for communications associated with a SBFD slot; identifying, based at least in part on an overlap between a BWP associated with the communications and a first subband of the SBFD slot, a starting RB within the first subband of the SBFD slot of at least one RB set associated with the FDRA, wherein the first subband of the SBFD slot has a different bandwidth than the BWP; and performing the communications during the SBFD slot in the first subband using the at least one RB set.

Aspect 2: The method of aspect 1, further comprising: identifying, based at least in part on the indication of the FDRA, a first FDRA for the first subband and a second FDRA for communications in a second subband, wherein the starting RB of the at least one RB set is identified based at least in part on the first FDRA.

Aspect 3: The method of aspect 2, wherein a number of bits in the first FDRA and the second FDRA is based at least in part on a number of RBs in the overlap between the BWP and the first subband of the SBFD slot.

Aspect 4: The method of any of aspects 2 through 3, wherein the indication comprises a separate FDRA for each subband in the SBFD slot.

Aspect 5: The method of any of aspects 1 through 4, further comprising: identifying, based at least in part on the indication of the FDRA, a shared FDRA for the first subband and a second subband in the SBFD slot, wherein the starting RB of the at least one RB set is identified based at least in part on the shared FDRA.

Aspect 6: The method of aspect 5, wherein the shared FDRA comprises a set of redundant bits associated with the first subband.

Aspect 7: The method of any of aspects 5 through 6, wherein the shared FDRA comprises a number of bits that are based at least in part on a number of RBs in the overlap between the BWP and the first subband of the SBFD slot.

Aspect 8: The method of any of aspects 5 through 7, wherein the shared FDRA comprises an indication of the starting RB and a total number of RBs in the at least one RB set.

Aspect 9: A method for wireless communication at a UE, comprising: receiving an indication of a FDRA for communications associated with a SBFD slot, wherein the FDRA is specific to a subband of the SBFD slot or an entirety of the SBFD slot; identifying, based at least in part on the FDRA, at least one RB set in a subband of the SBFD slot; and performing communications during the SBFD slot in the subband using the at least one RB set.

Aspect 10: The method of aspect 9, further comprising: identifying, based at least in part on a different bandwidth of a BWP relative to the subband of the SBFD slot, a starting RB of the at least one RB set in the subband according to the FDRA.

Aspect 11: The method of aspect 10, further comprising: identifying one or more RB sets in the subband that overlap with a second subband of the SBFD slot; and dropping the one or more RB sets for the communications based at least in part on the overlap with the second subband.

Aspect 12: The method of any of aspects 10 through 11, further comprising: identifying a second RB set in the subband that overlaps with a second subband of the SBFD slot; and performing the communication during the SBFD slot using the at least one RB set and communications during a second SBFD slot using the second RB set based at least in part on the overlap with the second subband.

Aspect 13: The method of any of aspects 10 through 12, further comprising: identifying a second RB set in the subband that overlaps with a second subband of the SBFD slot; modifying the at least one RB set and the second RB set based at least in part on the overlap; and performing the communication during the SBFD slot using the modified at least one RB set and second RB set.

Aspect 14: The method of any of aspects 10 through 13, further comprising: identifying a second RB set in the subband that overlaps with a second subband of the SBFD slot; identifying an offset between the at least one RB set and the second RB set, wherein the offset identifies RB sets offset in the subband that is a disjointed subband; and performing the communication during the SBFD slot using the at least one RB set and the second RB set based at least in part on the disjointed subband.

Aspect 15: A method for wireless communication at a network entity, comprising: transmitting an indication of a FDRA for communications associated with a SBFD slot, the FDRA identifying, based at least in part on an overlap between a BWP associated with the communications and a first subband of the SBFD slot, a starting RB within the first subband of the SBFD slot of at least one RB set, wherein the first subband of the SBFD slot has a different bandwidth than the BWP; and performing the communications during the SBFD slot in the first subband using the at least one RB set.

Aspect 16: The method of aspect 15, further comprising: identifying, based at least in part on the indication of the FDRA, a first FDRA for the first subband and a second FDRA for communications in a second subband, wherein the starting RB of the at least one RB set is identified based at least in part on the first FDRA.

Aspect 17: The method of aspect 16, wherein a number of bits in the first FDRA and the second FDRA is based at least in part on a number of RBs in the overlap between the BWP and the first subband of the SBFD slot.

Aspect 18: The method of any of aspects 16 through 17, wherein the indication comprises a separate FDRA for each subband in the SBFD slot.

Aspect 19: The method of any of aspects 15 through 18, further comprising: identifying, based at least in part on the indication of the FDRA, a shared FDRA for the first subband and a second subband in the SBFD slot, wherein the starting RB of the at least one RB set is identified based at least in part on the shared FDRA.

Aspect 20: The method of aspect 19, wherein the shared FDRA comprises a set of redundant bits associated with the first subband.

Aspect 21: The method of any of aspects 19 through 20, wherein the shared FDRA comprises a number of bits that are based at least in part on a number of RBs in the overlap between the BWP and the first subband of the SBFD slot.

Aspect 22: The method of any of aspects 19 through 21, wherein the shared FDRA comprises an indication of the starting RB and a total number of RBs in the at least one RB set.

Aspect 23: A method for wireless communication at a network entity, comprising: transmitting an indication of a FDRA for communications associated with a SBFD slot, wherein the FDRA is specific to a subband of the SBFD slot or an entirety of the SBFD slot, the indication of the FDRA identifying, based at least in part on the FDRA, at least one RB set in a subband of the SBFD slot; and performing communications during the SBFD slot in the subband using the at least one RB set.

Aspect 24: The method of aspect 23, further comprising: identifying, based at least in part on a different bandwidth of the BWP relative to the subband of the SBFD slot, a starting RB of the at least one RB set in the subband according to the FDRA.

Aspect 25: The method of aspect 24, further comprising: identifying one or more RB sets in the subband that overlap with a second subband of the SBFD slot; and dropping the one or more RB sets for the communications based at least in part on the overlap with the second subband.

Aspect 26: The method of any of aspects 24 through 25, further comprising: identifying a second RB set in the subband that overlaps with a second subband of the SBFD slot; and performing the communication during the SBFD slot using the at least one RB set and communications during a second SBFD slot using the second RB set based at least in part on the overlap with the second subband.

Aspect 27: The method of any of aspects 24 through 26, further comprising: identifying a second RB set in the subband that overlaps with a second subband of the SBFD slot; modifying the at least one RB set and the second RB set based at least in part on the overlap; and performing the communication during the SBFD slot using the modified at least one RB set and second RB set.

Aspect 28: The method of any of aspects 24 through 27, further comprising: identifying a second RB set in the subband that overlaps with a second subband of the SBFD slot; identifying an offset between the at least one RB set and the second RB set, wherein the offset identifies RB sets offset in the subband that is a disjointed subband; and performing the communication during the SBFD slot using the at least one RB set and the second RB set based at least in part on the disjointed subband.

Aspect 29: An apparatus for wireless communication at a UE, comprising at least one processor; and memory coupled with the at least one processor, the memory storing instructions executable by the at least one processor to cause the UE to perform a method of any of aspects 1 through 8.

Aspect 30: An apparatus for wireless communication at a UE, comprising at least one means for performing a method of any of aspects 1 through 8.

Aspect 31: A non-transitory computer-readable medium storing code for wireless communication at a UE, the code comprising instructions executable by a processor to perform a method of any of aspects 1 through 8.

Aspect 32: An apparatus for wireless communication at a UE, comprising at least one processor; and memory coupled with the at least one processor, the memory storing instructions executable by the at least one processor to cause the UE to perform a method of any of aspects 9 through 14.

Aspect 33: An apparatus for wireless communication at a UE, comprising at least one means for performing a method of any of aspects 9 through 14.

Aspect 34: A non-transitory computer-readable medium storing code for wireless communication at a UE, the code comprising instructions executable by a processor to perform a method of any of aspects 9 through 14.

Aspect 35: An apparatus for wireless communication at a network entity, comprising at least one processor; and memory coupled with the at least one processor, the memory storing instructions executable by the at least one processor to cause the network entity to perform a method of any of aspects 15 through 22.

Aspect 36: An apparatus for wireless communication at a network entity, comprising at least one means for performing a method of any of aspects 15 through 22.

Aspect 37: A non-transitory computer-readable medium storing code for wireless communication at a network entity, the code comprising instructions executable by a processor to perform a method of any of aspects 15 through 22.

Aspect 38: An apparatus for wireless communication at a network entity, comprising at least one processor; and memory coupled with the at least one processor, the memory storing instructions executable by the at least one processor to cause the network entity to perform a method of any of aspects 23 through 28.

Aspect 39: An apparatus for wireless communication at a network entity, comprising at least one means for performing a method of any of aspects 23 through 28.

Aspect 40: A non-transitory computer-readable medium storing code for wireless communication at a network entity, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), or ascertaining. Also, "determining"

can include receiving (e.g., receiving information), accessing (e.g., accessing data stored in memory), or obtaining. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   memory coupled with the at least one processor, the memory storing instructions executable by the at least one processor to cause the UE to:
      receive an indication of a frequency domain resource allocation for communications associated with a subband full-duplex (SBFD) slot;
      identify, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part; and
      perform the communications during the SBFD slot in the first subband using the at least one resource block set.

2. The apparatus of claim 1, wherein the instructions are further executable by the at least one processor to cause the UE to:
   identify, based at least in part on the indication of the frequency domain resource allocation, a first frequency domain resource allocation for the first subband and a second frequency domain resource allocation for communications in a second subband, wherein the starting resource block of the at least one resource block set is identified based at least in part on the first frequency domain resource allocation.

3. The apparatus of claim 2, wherein a number of bits in the first frequency domain resource allocation and the second frequency domain resource allocation is based at least in part on a number of resource blocks in the overlap between the bandwidth part and the first subband of the SBFD slot.

4. The apparatus of claim 2, wherein the indication comprises a separate frequency domain resource allocation for each subband in the SBFD slot.

5. The apparatus of claim 1, wherein the instructions are further executable by the at least one processor to cause the UE to:
   identify, based at least in part on the indication of the frequency domain resource allocation, a shared frequency domain resource allocation for the first subband and a second subband in the SBFD slot, wherein the starting resource block of the at least one resource block set is identified based at least in part on the shared frequency domain resource allocation.

6. The apparatus of claim 5, wherein the shared frequency domain resource allocation comprises a set of redundant bits associated with the first subband.

7. The apparatus of claim 5, wherein the shared frequency domain resource allocation comprises a number of bits that are based at least in part on a number of resource blocks in the overlap between the bandwidth part and the first subband of the SBFD slot.

8. The apparatus of claim 5, wherein the shared frequency domain resource allocation comprises an indication of the starting resource block and a total number of resource blocks in the at least one resource block set.

9. A method for wireless communications at a user equipment (UE), comprising:
   receiving an indication of a frequency domain resource allocation for communications associated with a subband full-duplex (SBFD) slot;
   identifying, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part; and
   performing the communications during the SBFD slot in the first subband using the at least one resource block set.

10. The method of claim 9, further comprising:
   identifying, based at least in part on the indication of the frequency domain resource allocation, a first frequency domain resource allocation for the first subband and a second frequency domain resource allocation for communications in a second subband, wherein the starting resource block of the at least one resource block set is identified based at least in part on the first frequency domain resource allocation.

11. The method of claim 10, wherein a number of bits in the first frequency domain resource allocation and the second frequency domain resource allocation is based at least in part on a number of resource blocks in the overlap between the bandwidth part and the first subband of the SBFD slot.

12. The method of claim 10, wherein the indication comprises a separate frequency domain resource allocation for each subband in the SBFD slot.

13. The method of claim 9, further comprising:

identifying, based at least in part on the indication of the frequency domain resource allocation, a shared frequency domain resource allocation for the first subband and a second subband in the SBFD slot, wherein the starting resource block of the at least one resource block set is identified based at least in part on the shared frequency domain resource allocation.

14. The method of claim 13, wherein the shared frequency domain resource allocation comprises a set of redundant bits associated with the first subband.

15. The method of claim 13, wherein the shared frequency domain resource allocation comprises a number of bits that are based at least in part on a number of resource blocks in the overlap between the bandwidth part and the first subband of the SBFD slot.

16. The method of claim 13, wherein the shared frequency domain resource allocation comprises an indication of the starting resource block and a total number of resource blocks in the at least one resource block set.

17. An apparatus for wireless communications at a user equipment (UE), comprising:

means for receiving an indication of a frequency domain resource allocation for communications associated with a subband full-duplex (SBFD) slot;

means for identifying, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part; and means for performing the communications during the SBFD slot in the first subband using the at least one resource block set.

18. The apparatus of claim 17, further comprising:

means for identifying, based at least in part on the indication of the frequency domain resource allocation, a first frequency domain resource allocation for the first subband and a second frequency domain resource allocation for communications in a second subband, wherein the starting resource block of the at least one resource block set is identified based at least in part on the first frequency domain resource allocation.

19. The apparatus of claim 18, wherein a number of bits in the first frequency domain resource allocation and the second frequency domain resource allocation is based at least in part on a number of resource blocks in the overlap between the bandwidth part and the first subband of the SBFD slot.

20. The apparatus of claim 18, wherein the indication comprises a separate frequency domain resource allocation for each subband in the SBFD slot.

21. The apparatus of claim 17, further comprising:

means for identifying, based at least in part on the indication of the frequency domain resource allocation, a shared frequency domain resource allocation for the first subband and a second subband in the SBFD slot, wherein the starting resource block of the at least one resource block set is identified based at least in part on the shared frequency domain resource allocation.

22. The apparatus of claim 21, wherein the shared frequency domain resource allocation comprises a set of redundant bits associated with the first subband.

23. The apparatus of claim 21, wherein the shared frequency domain resource allocation comprises a number of bits that are based at least in part on a number of resource blocks in the overlap between the bandwidth part and the first subband of the SBFD slot.

24. The apparatus of claim 21, wherein the shared frequency domain resource allocation comprises an indication of the starting resource block and a total number of resource blocks in the at least one resource block set.

25. A non-transitory computer-readable medium storing code for wireless communications at a user equipment (UE), the code comprising instructions executable by a processor to:

receive an indication of a frequency domain resource allocation for communications associated with a subband full-duplex (SBFD) slot;

identify, based at least in part on an overlap between a bandwidth part associated with the communications and a first subband of the SBFD slot, a starting resource block within the first subband of the SBFD slot of at least one resource block set associated with the frequency domain resource allocation, wherein the first subband of the SBFD slot has a different bandwidth than the bandwidth part; and perform the communications during the SBFD slot in the first subband using the at least one resource block set.

* * * * *